United States Patent Office 2,695,276
Patented Nov. 23, 1954

---

2,695,276

POLYSILOXANE RESIN COMPOSITIONS

David B. Hatcher, Toledo, Ohio, assignor, by mesne assignments, to Allied Chemical & Dye Corporation, New York, N. Y., a corporation of New York No Drawing. Application July 11, 1951,
Serial No. 236,281

5 Claims. (Cl. 260—18)

The invention relates to synthetic resins consisting of modified epihalohydrin condensation polymers.

Epihalohydrin condensation polymers are inexpensive and readily available synthetic resins that have great potential commercial value. The one factor that imposes the greatest limitation on the commercialization of such polymers is their limited durability. The principal object of the invention is the chemical modification of epihalohydrin condensation polymers to improve their alkali resistance, weather resistance, water resistance, etc. More specific objects and advantages are apparent from the description, which illustrates and discloses but is not intended to limit the invention.

A synthetic resin embodying the invention is an ester of a silanol with a fatty acid-modified epihalohydrin condensation polymer.

Epihalohydrin condensation polymer

The term "epihalohydrin condensation polymer" is used herein to include synthetic resins that are produced by means of a reaction between an epihalohydrin in which the halogen atom has an atomic weight between 35 and 80 (i. e., epichlorohydrin or epibromohydrin) and either (1) a dihydric phenol (or mixture of dihydric phenols) or (2) a sulfonamide whose molecule has at least two hydrogen atoms each connected to a sulfonamide nitrogen atom (or mixture of such sulfonamides). It has been found that it is possible to react an epihalohydrin molecule with two hydrogen atoms derived from a sulfonamide group or derived from the hydroxy groups in a dihydric phenol, so that the product of such a reaction is polymeric.

The specific reaction by which an epihalohydrin condensation polymer is produced takes place by addition of hydrogen to an epoxy group (i. e., the group

a secondary alcohol being formed as a product of this reaction which is believed to occur between the epoxy group of an epihalohydrin and a hydrogen atom derived from a sulfonamide or a dihydric phenol is shown in Equation 1, below, the formula HA in this equation being use to represent a sulfonamide or dihydric phenol molecule (i. e., A is the residue that would be formed by removal of a hydrogen atom from the molecule of a sulfonamide or a dihydric phenol):

(1) 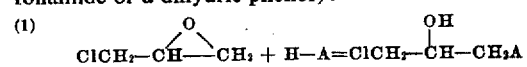

It has been found that the product of a reaction corresponding to Equation 1, when treated with a strong base, yields a compound containing an epoxy group; this reaction is believed to proceed according to Equation 2, below:

(2) 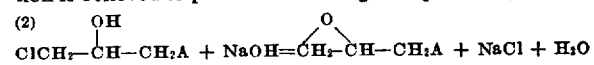

The epoxy compound produced by a reaction corresponding to Equation 2 can then be reacted with a substance having the formula H—A'; it is believed that the epoxy group undergoes a reaction similar to that represented in Equation 1 to produce a compound having a general formula corresponding to Formula 3, below:

(3) 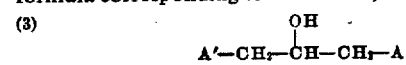

Because the molecule of the sulfonamide or dihydric phenol which is reacted with an epihalohydrin to produce a condensation product for use in the practice of the invention has at least two reactive hydrogen atoms, such a reaction produces long chain molecules comprised of repeating units having the formula

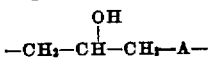

Fatty acid-modified epihalohydrin condensation polymers are produced by esterifying the reactive OH groups in the polymers with the desired fatty acid modifying agent, as hereinafter further discussed.

The term "dihydric phenol" is used herein to include (a) mono-nuclear dihydric phenols, i. e., dihydroxybenzenes (e. g., pyrocatechol, resorcinol and hydroquinone), (b) polynuclear dihydric phenols such as dihydroxy diphenyls (e. g., 4,4'-dihydroxy diphenyl), dihydroxy naphthalenes and dihydroxy anthracenes; (c) the condensation products of monohydric phenols with saturated aliphatic-, arylaliphatic-, aryl-, and cyclic-ketones and -aldehydes; and (d) dihydric phenols as described in (a), (b) and (c) in which one or more nuclei are alkyl- or halo-substituted in any of the available positions, the alkyl side chains including lower alkyl groups such as methyl, ethyl, propyl, butyl and hexyl, and the halo radicals including chloro and fluoro.

Dihydric phenols as described in (c) above include for example, bisphenol, a mixture comprising bis(hydroxyphenyl) - dimethylemethanes, predominantly bis(4 - hydroxyphenyl)dimethylmethane with lesser quantities of bis(2 - hydroxyphenyl)dimethylmethane and 4-hydroxyphenyl - 2-hydroxyphenyldimethylmethane; bis(hydroxyphenyl)methanes, such as bis(2-hydroxyphenyl)methane, bis(3 - hydroxyphenyl)methane, bis(4 - hydroxyphenyl)-methane; 2-hydroxyphenyl-3-hydroxyphenylmethane; 3-hydroxyphenyl - 4-hydroxyphenylmethane;. bis(hydroxyphenyl)methylmethanes; bis(hydroxyphenyl)ethylmethylmethanes; bis(hydroxyphenyl)diethylmethanes; bis(hydroxyphenyl)methylpropylmethanes; b i s(hydroxyphenyl)methylphenylmethanes; bis(hydroxyphenyl)ethylphenylmethanes; bis(hydroxyphenyl)butylphenylmethanes; bis-(hydroxyphenyl)propylphenylmethanes; b i s(hydroxy - phenyl)tolylmethanes; b i s(hydroxynaphthyl)methanes; bis(hydroxyphenyl)cyclohexanes; bis(hydroxyphenyl)-cyclohexylmethanes; and bis(hydroxyphenyl)dicyclohexylmethanes. The ketones and aldehydes with which monohydric phenols may be condensed to produce these and other such dihydric phenols include those having the general formula

in which R and R' may each be hydrogen, methyl, ethyl, propyl, isopropyl, butyl, isobutyl, pentyl, isopentyl, hexyl, isohexyl, cyclohexyl or phenyl, or an alkyl-substituted cyclohexyl or phenyl in which each alkyl substituent has from one to six carbon atoms. For example, bisphenol is produced by condensing phenol with acetone.

A sulfonamide that can be reacted with an epihalohydrin to produce a condensation polymer that may be used in the practice of the invention may have the general formula

or

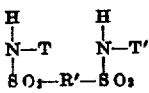

in which R is a monovalent aromatic or aliphatic or cycloaliphatic hydrocarbon radical; each of the radicals T and T' is hydrogen or a monovalent aromatic or aliphatic radical; and R' is a divalent aromatic or aliphatic or cycloaliphatic hydrocarbon radical.

R (or R') may be a monovalent (or divalent) radical which can be considered to be derived (by the removal of one or two hydrogens) from the molecule of a straight or branched chain, saturated or unsaturated aliphatic hydrocarbon. The monovalent radical R may be derived (by removal of any hydrogen) from a hydrocarbon having from 1 to 18 carbon atoms. Thus, R may be derived from methane, ethane, ethylene, propane, propene, either butane, any butene, or any alkane or unsaturated aliphatic hydrocarbon having from 5 to 18 carbon atoms. R' may be derived (by removal of two hydrogens) from a hydrocarbon having from 3 to 18 carbon atoms, i. e., may be derived from any of the hydrocarbons last decribed except methane, ethane or ethylene. The two free valences of the radical R' are not attached to the same carbon atom or to adjacent carbon atoms.

R (or R') also may be a monovalent (or divalent) radical which can be considered to be derived (by the removal of one or two hydrogens) from the molecule of a cycloalkane. R may be derived (by removal of any hydrogen) from cyclopentane, cyclohexane or an alkylated cyclopentane or cyclohexane, or a derivative of cyclopentane or cyclohexane in which two carbon atoms in the ring of cyclopentane, cyclohexane or an alkylated cyclopentane or cyclohexane are common to the ring of another such cycloalkane. When R is such a radical that it can be considered to be derived from an alkylated cyclopentane or cyclohexane, the alkyl radicals on each ring may be methyl or ethyl and may be from one to two in number. In a radical R', derived by the removal of two hydrogens from the molecule of a cycloalkane, the free valences are not attached to the same carbon atom, or to adjacent adjacent carbon atoms in an alkyl side chain.

R (or R') also may be a monovalent (or divalent) radical derived (by the removal of one or two hydrogens) from the molecule of an aromatic hydrocarbon. When R or R' is derived from an aromatic hydrocarbon it is usually economically desirable that it be derived from benzene, naphthalene, an alkylated benzene or an alkylated naphthalene. When R or R' is derived from a mono-alkyl benzene it is usually not advantageous that the alkyl group have more than 18 carbon atoms. Also it is desirable that the alkylated benzene have no more than four alkyl groups; or, if more than one alkyl group, that the total number of carbon atoms in each molecule of the alkylated benzene not exceed 14. When the alkylated benzene has from two to four alkyl groups it may have a total of from 8 to 14 carbon atoms (i. e., all the alkyl groups may contain a total of from 2 to 8 carbon atoms); the alkyl groups may be any combination of from two to four alkyls so long as the total number of carbon atoms in these groups does not exceed 8. Each alkyl group may be in any position (i. e., attached to any nuclear carbon atom). When R and R' is derived from an alkylated naphthalene it may have from one to two alkyl radicals each of which is methyl or ethyl. Each methyl or ethyl radical may be bonded to any nuclear carbon atom that is not attached to a sulfonamide group. If a sulfonamide group is attached to a carbon atom in one of the side chains of an alkylated benzene or an alkylated naphthalene, no adjacent carbon atom in that side chain should be attached to another sulfonamide group, and not more than one sulfonamide group should be attached to any one carbon atom in a side chain.

R (or R') also may be a monovalent (or divalent) radical derived from an ether. The ether from which R or R' is derived may be a dialkyl ether, a dialkyl ether of ethylene glycol, a dairyl ether or an alkyl-aryl diether. Each alkyl radical of the dialkyl ether or the dialkyl ether of ethylene glycol may have from two to four carbon atoms. Each aryl group of the diaryl ether or alkyl-aryl ether may be phenyl or an alkyl phenyl radical. When the aryl group is an alkyl phenyl radical it may have one or two side chains each of which consists of an alkyl radical having one or two carbon atoms. The alkyl radical of the alkyl-aryl ether is one having from one to five carbon atoms. It is much easier to prepare a sulfonamide in which sulfur is attached to the aromatic group of such an ether, so this type of sulfonamide is preferable (for economic reasons) to that in which the sulfonamide group is attached to the alkyl group in such an ether.

R or R' also may be derived from an ether of the general type E-O(-t-O)$_n$-E' in which $n$ is an integer from from 1 to 3, $t$ is an alkylene radical having from 2 to 18 carbon atoms and each of the radicals E and E' is an aryl radical having one or two benzene nuclei (i. e., phenyl, naphthyl or biphenyl).

R or R' may be derived from biphenyl, from diphenyl methane, from 1,2-diphenyl ethane, or from a diphenyl alkane of unknown structure produced by reacting a dichlorinated kerosene with benzene.

In order than an epihalohydrin condensation polymer derived from reaction between a sulfonamide and an epihalohydrin may have a comparatively high molecular weight, the sulfonamide should have at least two hydrogen atoms that are connected to a sulfonamide nitrogen atom. When an epihalohydrin is reacted with a monosulfonamide both the hydrogen atoms in the sulfonamide group should react with the epihalohydrin in order to produce a polymer. However, an epihalohydrin may be reacted with disulfonamide in which one or two of the four hydrogen atoms of the sulfonamide groups have been replaced by organic radicals. Both hydrogens in one sulfonamide group may be replaced; one hydrogen in each sulfonamide group may be replaced; or one hydrogen in either sulfonamide group may be replaced. A monovalent radical (the radical T, hereinbefore described) is substituted for each sulfonamide hydrogen replaced. T can be considered to be derived by the removal of one hydrogen from the molecule of a straight or branched chain, saturated or unsaturated aliphatic hydrocarbon such as methane, ethane, propane, propene, either butane, any butene, or any alkane or unsaturated aliphatic hydrocarbon having from 5 to 18 carbon atoms. The monovalent radical which replaces hydrogen also may be one derived by the removal of one hydrogen from an aromatic hydrocarbon such as benzene, naphthalene, an alkylated benzene or an alkylated naphthalene. An alkylated benzene from which T is derived may have from one to four alkyl radicals, no one of which has more than 18 carbon atoms; if there are two or more alkyl radicals, the total number of carbon atoms in each alkyl benzene is from 8 to 14 (i. e., all the alkyl substituents contain a total of from 2 to 8 carbon atoms) as hereinbefore described. When the aryl radical is derived from an alkylated naphthalene it may have from one to two alkyl radicals, each of which is methyl or ethyl, as hereinbefore described.

Examples of sulfonamides that may be reacted with an epihalohydrin to produce an epihalohydrin condensation polymer for use in the practice of the invention include 4-methyl-4'-biphenyl sulfonamide, N,N'-di-n-butyl diphenyl ether disulfonamide, p-toluene sulfonamide, benzene sulfonamide, diethyl ether-2,2'-disulfonamide, m-benzine disulfonamide, 4,4'-diphenyl ether disulfonamide, 1,2-diphenoxy ethane-4,4'-disulfonamide, 4,4'-(alpha,beta-diphenoxy propane) disulfonamide, 4,4'-(beta,beta'-diphenoxy ethyl ether) disulfonamide, N,N'-diallyl diphenyl ether disulfonamide, ethane sulfonamide, propane sulfonamide, n-butane sulfonamide, isobutane sulfonamide, 1,5-pentane disulfonamide, cyclohexane sulfonamide, 1,4-cylcohexane disulfonamide, 4-methyl-1,3-benzene disulfonamide, diphenoxy diethylene glycol disulfonamides, 2,3-dimethyl benzene disulfonamide, 1,4-naphthalene disulfonamide, 2,6-naphthalene disulfonamide, 2,7-naphthalene disulfonamide, 1-naphthalene sulfonamide, 2-naphthalene sulfonamide, 2-biphenyl sulfonamide, 4-biphenyl sulfonamide, 4,4'-biphenyl disulfonamide, diphenoxy triethylene glycol disulfonamides, 1-methoxy-2,4-benzene disulfonamide and 1-ethoxy-2,4-benzene disulfonamide.

Sulfonamides are usually prepared by means of reaction between ammonia and a sulfonyl chloride. The procedure by which this reaction is conducted is illustrated by the following: 2,2-diphenoxyethyl ether-4,4'-disulfonyl chloride (26 grams) is dissolved in chloroform (250 ml.) and ammonium hydroxide (100 ml. of 28 weight per cent aqueous solution) is added to this solution, with stirring. The sulfonamide precipitates during the course of the 30-minute reaction, and is separated by filtration. Pure 2,2-diphenoxyethyl ether-4,4'-disulfonamide is obtained by dissolving the crude product in about 100 ml. of about 10 weight per cent sodium hydroxide and reprecipitating it by making the solution slightly acid with aqueous hydrochloric acid. Numerous other sulfonyl chlorides can be used to produce sulfonamides by means of this reaction, including (A) monosulfonyl chlorides derived from benzene or an alkyl-substituted benzene such as 2-methylbenzenesulfonyl chloride, 3-methylbenzenesulfonyl chloride, 4- methylbenzenesulfonyl chloride, 2-ethylbenzenesulfonyl chloride, 3 - ethylbenzenesulfonyl chloride, 4-ethylbenzenesulfonyl chloride, 3 - n - propylbenzenesulfonyl chloride, 4-n-propylbenzenesulfonyl chloride, 4-isopropylbenzenesulfonyl chloride, 4-sec-butylbenzenesulfonyl chloride, 4 - tert - butylbenzenesulfonyl chloride, 4-(1-pentyl)benzenesulfonyl chloride, 4-(2-pentyl)benzenesulfonyl chloride, 4 - (3 - pentyl)benzenesulfonyl chloride, 4-neopentylbenzenesulfonyl chloride, 2,3-dimethylbenzenesulfonyl chloride, 3,4-dimethylbenzenesulfonyl chloride, 2,6-dimethylbenzenesulfonyl chloride, 2,4 - dimethylbenzenesulfonyl chloride, 3,5 - dimethylbenzenesulfonyl chloride, 2,5 - dimethylbenzenesulfonyl chloride, 2-methyl-5-ethylbenzenesulfonyl chloride, 2-methyl-4-n-propylbenzenesulfonyl chloride, 2-methyl-5-n-propylbenzenesulfonyl chloride, 5-methyl-2-n-propylbenzenesulfonyl chloride, 3-methyl-4-isopropylbenzenesulfonyl chloride, 4-methyl-3-isopropylbenzenesulfonyl chloride, 4-methyl-2-isopropylbenzenesulfonyl chloride, 2-methyl-4-isopropylbenzenesulfonyl chloride, 2-methyl-5-isopropylbenzenesulfonyl chloride, 5-methyl-2-isopropylbenzenesulfonyl chloride, 2-methyl-4-tert-butylbenzenesulfonyl chloride, 2-methyl - 5 - sec-butylbenzenesulfonyl chloride, 2-methyl - 5 - n-butylbenzenesulfonyl chloride, 2-methyl-4-sec-butylbenzenesulfonyl chloride, 3,4-diethylbenzenesulfonyl chloride, 2,4-diethylbenzenesulfonyl chloride, 2,5-diethylbenzenesulfonyl chloride, 2-ethyl-5-n-propylbenzenesulfonyl chloride, 2-ethyl-5-isopropylbenzenesulfonyl chloride, 2,3,4 - trimethylbenzenesulfonyl chloride, 2,3,6 - trimethylbenzenesulfonyl chloride, 2,4,5-trimethylbenzenesulfonyl chloride, 2,3,5-trimethylbenzenesulfonyl chloride, 2,4,6-trimethylbenzenesulfonyl chloride, 4,5-dimethyl - 2 - ethylbenzenesulfonyl chloride, 3,6-dimethyl-2-ethylbenzenesulfonyl chloride, 2,4-dimethyl - 5 - ethylbenzenesulfonyl chloride, 2,6-dimethyl-4-ethylbenzenesulfonyl chloride, 2,4-dimethyl - 6 - ethylbenzenesulfonyl chloride, 2,3,4,5-tetramethylbenzenesulfonyl chloride, 2,3,4,6-tetramethylbenzenesulfonyl chloride and 2,3,5,6-tetramethylbenzenesulfonyl chloride.

Sulfonamides can also be produced by means of such a reaction using (B) disulfonyl chlorides derived from benzene such as benzene-1,2-disulfonyl chloride, benzene-1,3-disulfonyl chloride, benzene - 1,4 - disulfonyl chloride, 4-ethylbenzene-1,3-disulfonyl chloride, 4-methylbenzene-1,2-disulfonyl chloride, 2-methylbenzene-1,3-disulfonyl chloride, 4-methylbenzene-1,3-disulfonyl chloride, 5-methylbenzene-1,3-disulfonyl chloride, 2-methylbenzene-1,4 - disulfonyl chloride, 1,2 - dimethylbenzene-3,5-disulfonyl chloride, 1,3 - dimethylbenzene-4,6-disulfonyl chloride, 1,3-dimethylbenzene-2,4-disulfonyl chloride, 1,4-dimethylbenzene-2,5-disulfonyl chloride, 1,4-dimethylbenzene-2,6-disulfonyl chloride, 1,4-dimethylbenzene-2,3-disulfonyl chloride, 1,3,5-trimethylbenzene-2,4-disulfonyl chloride, biphenyl-2,2'-disulfonyl chloride, biphenyl-3,3'-disulfonyl chloride, 4,4'-dimethyl-biphenyl-2,2'-disulfonyl chloride, 5,5'-dimethyl-biphenyl-2,2'-disulfonyl chloride and diphenylmethane-4,4'-disulfonyl chloride.

Monosulfonyl chloride derived from naphthalene can also be used to produce sulfonamides by means of a similar reaction. Such sulfonyl chlorides include (C) 1-methylnaphthalene-3-sulfonyl chloride, 1-methylnaphthalene-4-sulfonyl chloride, 1-methylnaphthalene-5-sulfonyl chloride, 1-methylnaphthalene-6-sulfonyl chloride, 1-methylnaphthalene - 7 - sulfonyl chloride, 2-methylnaphthalene-1-sulfonyl chloride, 2-methylnaphthalene-6-sulfonyl chloride, 2-methylnaphthalene-8-sulfonyl chloride, 2-ethylnaphthalene-6-sulfonyl chloride, 2-isopropylnaphthalene - 1 - sulfonyl chloride, 1 - benzylnaphthalene-4-sulfonyl chloride, 1,6-dimethylnaphthalene-4-sulfonyl chloride, 6,7-dimethylnaphthalene-1-sulfonyl chloride, 2,6-dimethylnaphthalene-1-sulfonyl chloride, 2,6-dimethylnaphthalene - 7 - sulfonyl chloride, 2,6-dimethylnaphthalene-8-sulfonyl chloride and 2,7-dimethylnaphthalene-3-sulfonyl chloride.

Disulfonyl chlorides derived from naphthalene can also be used. Such sulfonyl chlorides include (D) naphthalene-1,3-disulfonyl chloride, naphthalene-1,4-disulfonyl chloride, naphthalene-1,5-disulfonyl chloride, naphthalene-1,6-disulfonyl chloride, naphthalene-1,7-disulfonyl chloride, naphthalene-2,6-disulfonyl chloride and naphthalene-2,7-disulfonyl chloride.

Other sulfonyl chlorides that can be used include (E) monosulfonyl chlorides derived from aryl-alkyl ethers such as 4-phenoxybenzene-1-sulfonyl chloride, 2-ethyoxynaphthalene - 1 - sulfonyl chloride, 1-ethoxynaphthalene-4-sulfonyl chloride, 2 - methoxynaphthalene-3-sulfonyl chloride, 2-methoxynaphthalene-6-sulfonyl chloride, 2-ethoxynaphthalene-6-sulfonyl chloride, 2-ethoxynaphthalene-7-sulfonyl chloride, 2-methoxynaphthalene-8-sulfonyl chloride, 2-ethoxynaphthalene - 8 - sulfonyl chloride, 2-methoxybenzenesulfonyl chloride, 2-ethoxybenzenesulfonyl chloride, 3 - methoxybenzenesulfonyl chloride, 3-ethoxybenzenesulfonyl chloride, 3-n-propoxybenzenesulfonyl chloride, 4 - methoxybenzenesulfonyl chloride, 4-ethoxybenzenesulfonyl chloride, 4-n-propoxybenzenesulfonyl chloride, 4 - n - butoxybenzenesulfonyl chloride, 4-methyl-2-methoxybenzenesulfonyl chloride, 3-methyl-2-methoxybenzenesulfonyl chloride, 4 - methyl-3-methoxybenzenesulfonyl chloride, 4-methyl-3-ethyl-3-methoxybenzenesulfonyl chloride, 2-methyl-3-methoxybenzenesulfonyl chloride, 2-methyl-6-methoxybenzenesulfonyl chloride, 3-methyl - 5 - methoxybenzenesulfonyl chloride, 3-methyl-4-methoxybenzenesulfonyl chloride, 3-methyl-4-ethoxybenzenesulfonyl chloride, 3-methyl-4-n-butoxybenzenesulfonyl chloride, 2-methyl-4-methoxybenzenesulfonyl chloride, 2-methyl-4-ethoxybenzenesulfonyl chloride, 2-n-propyl-4-ethoxybenzenesulfonyl chloride, 2-methyl-5-methoxybenzenesulfonyl chloride, 2-methyl-5-ethoxybenzenesulfonyl chloride, 5-methyl-2-methoxybenzenesulfonyl chloride, 5-methyl-2-ethoxybenzenesulfonyl chloride, 5 - methyl-n-propoxybenzenesulfonyl chloride, 5-n-propyl-2-methoxybenzenesulfonyl chloride and 5-n-proplyl-2-ethoxybenzenesulfonyl chloride.

Disulfonyl chlorides derived from aryl-alkyl ethers can also be used to prepare such sulfonamides. Examples of these disulfonyl chlorides include (F) 2-ethoxynaphthalene-1,6-disulfonyl chloride, 2-ethoxynaphthalene-3,6-disulfonyl chloride, 2-ethoxynaphthalene-6,8-disulfonyl chloride, 1-methoxybenzene-2,4-disulfonyl chloride, 1-ethoxybenzene-2,5-disulfonyl chloride, 1-ethoxybenzene-2,4-disulfonyl chloride and 1-methyl-3-methoxybenzene-4,6-disulfonyl chloride.

Alkenesulfonyl chlorides are produced less readily than are the corresponding aromatic compounds. However, alkanesulfonyl chlorides (from which can be produced alkanesulfonamides, as hereinbefore described) can be produced by means of a reaction between an alkanesulfonic acid and phosphorus pentachloride. The alkanesulfonic acids are well known and their properties have been determined.

A sulfonamide having the general formula

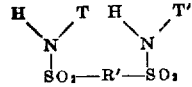

(in which one or two sulfonamide hydrogens have been replaced by an aromatic or aliphatic radical) can be prepared by means of a reaction between a disulfonyl chloride and an amine or mixture of amines having the general formula T—NH₂ or T—NH₂ and T'—NH₂. In order to demonstrate the procedure by which such a reaction may be conducted the following method is described:

Diphenyl ether disulfonyl chloride (a total of 110 grams) is added in about 20 gram portions to stirred butyl amine (88 grams). Benzene is added as needed to keep the reaction mixture sufficiently fluid that it can be stirred readily. When all the diphenyl ether disulfonyl chloride has been added to the butyl amine the mixture is held, with stirring, at about 50° C. for about 30 minutes. The mixture is then cooled; water is added; and the solids are separated by filtration. Pure N,N'-di-n-butyl diphenyl ether disulfonamide (83 grams; melting point, 145–146° C.) is obtained by crystallization from a benzene solution. An analogous procedure using 78 grams of allyl amine and 110 grams of diphenyl ether disulfonyl chloride yields 37 grams of N,N'-diallyl diphenyl ether disulfonamide (melting point 130–133° C.).

It is advantageous in the preparation of a condensation polymer to react with an epihalohydrin a disulfonamide having at least one hydrogen atom attached to each of the nitrogen atoms in the sulfonamide groups. The two sulfonamide groups and the hydrocarbon radical to which they are bonded are believed to form a part of the molecular chain of the resin resulting from reaction between such a sulfonamide and an epihalohydrin. This type of molecular structure is contrasted with that believed to result when an epihalohydrin reacts with the two hydrogen atoms in a single sulfonamide group, in which only the nitrogen atom of one sulfonamide group is thought to be a part of the molecular chain of the resin, the rest of the molecule of the sulfonamide starting material appearing as a side chain bonded to this nitrogen atom. If desired, the copolymers used in the present invention may be combinations of these two types of resins.

A preferred starting material is N,N'-di-n-butyl diphenyl ether 4,4'-disulfonamide.

When the sulfonamide that is reacted with an epihalohydrin is a disulfonamide having at least three hydrogen atoms which will react with the epoxy group of the epihalohydrin, fast curing resins are obtained. That is, such reactions produce cross-linked molecules composed of repeating units having the formula

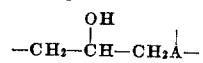

or

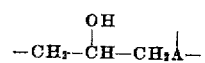

wherein A is the residue that would be formed by removal of hydrogen from the molecule of such a disulfonamide.

In the preparation of an epihalohydrin condensation polymer, by reaction of an epihalohydrin with a sulfonamide, the sulfonamide first may be dissolved in an aqueous solution of a strong base. The epihalohydrin is then added to the solution. Exothermic reaction usually proceeds at room temperature, but it is ordinarily desirable to heat the mixture (usually to a temperature not higher than about 100° C.). Separation of an oily layer from the water solution indicates resin formation. It is desirable to reflux the mixture for a short period of time (e. g., about 30 minutes) after the exothermic reaction is complete. The resin is then separated from the water layer, e. g., by decantation or in a separatory funnel. The resin is next washed with water (preferably hot water). In some instances it is desirable to wash the resin with an acid before the water wash. (If the resin is washed with an acid before the water wash, the resin is not curable.) The resin is dried by heating on a hot plate while a stream of air or other gas is bubbled through it.

As is indicated by Equations 1 and 2, above, it is believed that an epihalohydrin such as epichlorohydrin and a monosulfonamide react in a 1:1 molar ratio to form a condensation polymer. Epichlorohydrin and a compound containing two unsubstituted sulfonamide groups are thought to react in a 2:1 molar ratio, i. e., 1 gram mol of epichlorohydrin reacts for every 2 gram atoms of hydrogen attached to sulfonamide nitrogen atoms in the sulfonamide molecule. Therefore, epichlorohydrin and a disulfonamide in which two of the sulfonamide hydrogens have been replaced by other radicals (i. e., aliphatic or aromatic radicals, as hereinbefore described) participate in the reaction in the same ratio as epichlorohydrin and monosulfonamide, i. e., in a 1:1 molar ratio. Epichlorohydrin and a disulfonamide in which one of the sulfonamide hydrogens (i. e., a hydrogen attached to the nitrogen atom in a sulfonamide group) has been replaced by another radical participate in the reaction in a 1.5:1 molar ratio. Reaction of a small excess of either ingredient is believed to limit the average length of the molecular chains formed by the reaction of the invention. The reaction is thought to proceed until so many of the reactive points are derived from the substance reacting in more than the ratio indicated above that further reaction does not occur. An inverse relationship is believed to obtain between the average molecular weight of the resin and the amount of the excess of either ingredient that has reacted, i. e., when a larger excess of either ingredient has reacted, the average molecular weight of the resin is smaller, the maximum molecular weight being achieved by reaction of approximately the theoretical quantities indicated above. For economic reasons, as well as because it is usually desirable that resins of comparatively high molecular weight be formed, it is preferable that epichlorohydrin and the sulfonamide be reacted in approximately the theoretical proportion, it usually being desirable that any excess be epichlorohydrin. However, it has been found that satisfactory condensation polymers can be produced using as little as 0.5 mol of epichlorohydrin for every two gram atoms of hydrogen, and that satisfactory resins can be produced using as much as three mols of epichlorohydrin for every two gram atoms of hydrogen, although it is ordinarily not desirable to use more than about two mols of epichlorohydrin for two gram atoms of hydrogen.

Epichlorohydrin and a sulfonamide can be reacted by simply mixing them and adding a basic material. However, if a base (such as pyridine) which is miscible with the sulfonamide-epichlorohydrin mixture is used, the reaction does not produce the desired resins. It is believed that the product of such a reaction is a simple, monomeric, substituted amide; such product is soluble in an aqueous solution of a strong base, but becomes insoluble after reaction (which produces the desired resins) in such medium for a short period of time. For this reason it is desirable to conduct the reaction in the presence of a strong base such as sodium hydroxide, potassium hydroxide, or any quaternary ammonium hydroxide such as trimethylbenzyl ammonium hydroxide. It is most convenient to introduce the strong base as an aqueous solution; if sufficient base is used the sulfonamide goes into solution readily; in most instances, the sulfonamide and the epichlorohydrin both go into solution after a short time (the solution is believed to prevail while the product of the reaction is monomeric in form, i. e., has a formula corresponding to that representing the product of Equation 1, above); and then the resin begins to precipitate from the solution. Equation 2 indicates that epichlorohydrin and the base react in a 1:1 molar ratio. In some instances, qualitative tests on resins produced by a reaction using a molar ratio of epichlorohydrin to base greater than 1:1 indicate the presence of chlorine in these resins; this is thought to indicate the presence of units derived from a reaction corresponding to that represented by Equation 1, above. It is usually desirable that the reaction be conducted in the presence of an amount of a strong base that is not more than approximately equivalent to the amount of epichlorohydrin reacted (i. e., one equivalent of the strong base for each mol of epichlorohydrin). It has been found that the reaction can be conducted with satisfactory results when a considerable excess of epichlorohydrin is used, i. e., as such as two mols of epichlorohydrin per equivalent of the strong base), but it is usually preferable that from about 1¼ to about 1½ mols of epichlorohydrin be used per equivalent of strong base. Conducting the reaction in the presence of a large amount of a strong base yields a product having a comparatively high pH; since the more stable resins are those having a relatively low pH; it is desirable to use the least amount of strong base that gives a satisfactory product.

The reaction between an epihalohydrin and a sulfonamide is exothermic in nature and has been found to proceed at temperatures as low as about 25° C., usually causing an increase in temperature. It is ordinarily desirable that the reaction be conducted at temperatures not substantially greater than 100° C. It is usually preferable that the reaction be conducted at temperatures of at least about 40° C., and it is ordinarily preferable that the mixture of reactants be maintained at a temperature not substantially higher than 75° C.

The resins produced from a monosulfonamide and epichlorohydrin may be washed with either an aqueous acid or water alone until the washings are found to be free of chlorine (e. g., by testing them with silver nitrate). The resins from disulfonamides and epichlorohydrin may be washed with an aqueous acid and then with water until the washings are found to be free of chlorine. The washed resins may be dried by heating them and, at the same time, bubbling a stream of heated air or other gas through the resins. Nitrogen or carbon dioxide may be used in place of the air.

In the production of a thermosetting epihalohydrin condensation polymer, i. e. by reaction in the presence of a base of an epihalohydrin with a disulfonamide whose molecule has at least three hydrogen atoms which will react with the epoxy group of the epihalohydrin, it is preferred that the molar ratio of epihalohydrin to base be not less than about 1.5 and not more than about 2.25, and that the mols of base reacted for every two gram atoms of hydrogen attached to sulfonamide nitrogen atoms be from about ⅞ to 2¼. Thermosetting condensation polymers produced by using the reactants in these quantities ordinarily have the most advantageous combination of stability, rate of cure and economy of production.

It is preferred that the epihalohydrin condensation polymer be derived from epichlorohydrin. The epichlorohydrin taking part in the reaction may be provided either by adding epichlorohydrin itself or by adding a substance which, under the conditions used, yields epichlorohydrin: For example, alpha gamma-glycerol dichlorohydrin

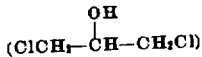

reacts in a 1:1 molar ratio with a strong base, as indicated by Equation 2, above, to produce epichlorohydrin. The epichlorohydrin, as fast as it is produced, may be reacted with a sulfonamide, as hereinbefore described. Thus, when alpha, gamma-glycerol dichlorohydrin is added to a sulfonamide instead of an equivalent amount of epichlorohydrin, an amount of a strong base within the range hereinbefore set forth is added to the reaction mixture, and (in addition) one mol of a strong base for each mol of alpha, gamma-glycerol dichlorohydrin. This additional strong base reacts with the alpha, gamma-glycerol dichlorohydrin to produce epichlorohydrin, which then reacts with the sulfonamide and the remaining strong base as hereinbefore described.

It is most desirable that the epihalohydrin condensation polymer be a condensation product of epichlorohydrin and a dihydric phenol, as hereinbefore defined. In the production of an epihalohydrin condensation polymer derived by reacting an epihalohydrin such as epichlorohydrin with a dihydric phenol, the reaction is carried out in the presence of caustic alkali equal to or somewhat in excess of the amount required to combine with all of the halogen of the halohydrin, the conditions being very similar to those employed when a sulfonamide is reacted with an epihalohydrin, as hereinbefore described. The aqueous alkali dihydric phenol and epihalohydrin may be mixed together initially. Alternatively, the alkali and dihydric phenol may be admixed and the epihalohydrin added thereto; or an aqueous solution of alkali and dihydric phenol may be added to the epihalohydrin. The reaction is exothermic, the evolution of heat serving to further the reaction. The rise in temperature during the reaction may be controlled by regulating the amount of water used in the form of aqueous alkali. Ordinarily it is desirable to heat the reaction mixture (usually to a temperature between about 80 and 110 degrees C.) after the exothermic reaction is complete, to complete the reaction. The time required for complete reaction varies from about 30 minutes to about 3 hours, depending upon the quantities of reactants used. As the resin is formed, an oily layer separates from the water solution. The upper aqueous layer is drawn off and the residue separates at the bottom of the reaction vessel. The resin is washed with hot water, to remove any unreacted alkali and the by-product sodium chloride, for example. Dilute acids may also be used for the washing procedure to neutralize excess alkali. The resin is then dried by heating. An organic solvent which does not react with the reactants or reaction product may be used instead of water in the preparation of the condensation product, but the use of water is preferred. However, in the case of condensation polymers which are soluble or partially soluble in hot water, in which the by-product salt is also soluble, an organic solvent may be used advantageously; in such case the polymer can be freed from by-product salt by filtration.

By regulating the proportions of the reactants, complex reaction products of predetermined hydroxyl content and molecular weight can be obtained. It is preferable that the molar ratio of epihalohydrin to dihydric phenol be within the range from about 1.15:1 to about 1.4:1 and it is most desirable that the molar ratio of epihalohydrin to dihydric phenol be about 1.25:1. It is preferred that the molar ratio of alkali to epihalohydrin be from about 1:1 to about 1.3:1.

The most desirable epihalohydrin condensation polymers for use in the practice of the invention are the condensation products of epichlorohydrin with bisphenol. Various grades of such resins, (i. e., resins of varying molecular weight, equivalent weight and solubility) are commercially available under the name "Epon" resins.

The epihalohydrin condensation polymers (prepared as hereinbefore described) for use in the practice of the invention are modified with fatty acids. Such modification improves the solubility and compatibility characteristics of the polymers so that they can be esterfied with silanols in the production of synthetic resins of the invention, as hereinafter further discussed. (Polymers, such as condensation products of epichlorohydrin with bisphenol, that are not modified with fatty acids do not react with silanols.)

A fatty acid which may be used to modify an epihalohydrin condensation polymer in the practice of the invention may be any saturated or unsaturated fatty acid having from two to eighteen carbon atoms. Such acids include fatty acids in the series from acetic to stearic, and acrylic, crotonic, isocrotonic, vinylacetic, methylacrylic, tiglic, angelic, senecioic, sorbic, hydrosorbic, 4-methylene-2-nonenoic, 4-tetradecenoic, α-methylene-butyric, α-ethylidene-caproic, propiolic, tetrolic, 3-butynoic, 2,8-decadiene-4,6-diynoic, tetracrylic, hypogaeic, oleic, elaidic, pentinoic, amylpropiolic, palmitolic, palmitoleic, linoleic, linolenic, elaeostearic, and ricinoleic acids.

Many fatty acids are available commercially as their glycerol esters, which are oils derived from natural sources; examples of oils that provide sources for fatty acids include coconut oil, palm kernel oil, babussu oil, murmuru oil, palm oil, rape seed oil, mustard seed oil, olive oil, peanut oil, sesame oil, corn oil, cottonseed oil, soybean oil, sunflower oil, walnut oil, linseed oil, perilla oil, castor oil, oiticica oil, whale oil, safflower oil and menhaden oil. Beef tallow, lard, and sardine and herring oils also are sources of fatty acids.

The fatty acid-modification of an epihalohydrin condensation polymer may be conducted by heating a mixture of the fatty acid and the polymer in the desired proportions at a temperature ranging between about 225 and about 275 degrees C. to obtain a product having an acid number not higher than 10 and preferably below 3, the time usually being not shorter than about two hours and not longer than about eight hours, varying, of course, with the temperature. It is desirable to conduct this heating in an inert atmosphere (e. g., of nitrogen or carbon dioxide), and the inert gas can conveniently be bubbled through the reaction mixture to effect stirring. The fatty acid-modified resin is then cooled and diluted to the desired per cent of solids (usually about 50 to about 65 per cent) with a hydrocarbon solvent, frequently xylene, toluene, a petroleum solvent (e. g., "Varnolene," a fraction obtained in the distillation of petroleum, boiling between 310° F. and 410° F., which consists substantially of high boiling aliphatic hydrocarbons), or an aliphatic hydrocarbon such as a heptane, or an octane. Other solvents, for example higher alcohols of the aliphatic series (e. g., butanols and higher) or higher boiling ethers (e. g., dibutyl ethers, propyl butyl ethers and higher) can be used, but it is usually preferred that the solvent be a simple hydrocarbon.

The minimum proportion of fatty acid employed to modify an epihalohydrin condensation polymer in the practice of the invention is that which imparts to the polymer sufficient solubility in mineral spirits and hydrocarbon solvents so that the polymer can be esterified with a silanol to obtain a resin of the invention. In general, the higher the fatty acid content, of a resin of the invention the softer the film that is obtained. Thus, the maximum proportion of fatty acid is that above which films of a resin of the invention are too soft to produce coatings having satisfactory hardness. Although a fatty acid-modified epihalohydrin condensation polymer in which from 25 to 75 per cent of the alcoholic hydroxy groups (i. e., hydroxy groups derived from the epoxy groups of the epihalohydrin) are esterified with a fatty acid may be used in the production of the present resins, the preferred polymers for use in the practice of the invention are those in which from 40 to 60 per cent of the alcoholic hydroxy groups are esterified with a fatty acid.

*Silanol*

As hereinbefore stated, a synthetic resin of the invention is an ester of a silanol with a fatty-acid modified epihalohydrin condensation polymer. The term "silanol" is used herein to mean a substance whose molecule contains at least one silicon atom to which at least one hydroxy radical is attached, and to which at least one hydrocarbon radical is attached by a

linkage. Thus, the term "silanol" includes polymeric silanols or siloxanols, which can be considered to be derived by condensation between hydroxy groups attached to silicon atoms in two or more molecules of monomeric silanols, with the formation of

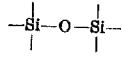

linkages. During the reaction by which the present resins are ordinarily produced hydroxy groups in silanol molecules condense with alcoholic hydroxy groups in a fatty acid-modified epihalohydrin condensation polymer to form

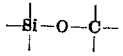

linkages. The term "alcoholic hydroxy group" is used herein to mean a hydroxy radical which is attached to an aliphatic carbon atom (as distinguished from a phenolic hydroxy radical, which is a hydroxy radical that is attached to a carbon atom contained in an aromatic nucleus). As hereinbefore discussed, the fatty acid-modified epihalohydrin condensation polymers employed in the practice of the invention have long chain linear or crosslinked molecules composed of repeating units having the formula

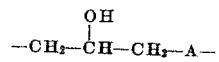

Thus, the free hydroxy groups (i. e., the hydroxy groups derived from the epoxy groups of the epihalohydrin) in such polymers are referred to herein as alcoholic hydroxy groups.

Silanols which may be esterified with a fatty acid-modified epihalohydrin condensation polymer in the production of synthetic resins of the invention can be prepared by hydrolyzing a hydrolyzable organosilane. A hydrolyzable organosilane (one or a mixture of which is used in the preparation of a resin of the present invention) may be any substance whose molecule consists of a silicon atom to which are attached four monovalent radicals, at least one of which is an hydrocarbon radical attached by a

linkage, such as an aliphatic radical, aryl radical, aralkyl radical or alkaryl radical, from one to three of which are hydrolyzable radicals and not more than two of which are hydrogen.

"Aliphatic radical" as used herein means a straight, branched, or closed chain aliphatic hydrocarbon radical having saturated

bonds. A straight or branched chain monovalent aliphatic radical attached to a silicon atom may be a primary or secondary alkyl radical having from one to twelve carbon atoms (i. e., methyl, ethyl, propyl, isopropyl, n-butyl, isobutyl, secondary butyl, or any primary or secondary alkyl radical having from 5 to 12 carbon atoms). A closed chain monovalent aliphatic radical attached to a silicon atom may be a cycloalkyl radical having 5 or 6 carbon atoms (i. e., cyclopentyl or cyclohexyl), or a mono-, di- or tri-alkyl-substituted cyclopentyl or cyclohexyl radical, each alkyl substituent being a primary, secondary or tertiary alkyl radical having from one to six carbon atoms, the total number of carbon atoms in the alkyl substituents being not more than six.

"Aryl radical" as used herein means a radical consisting of from one to three benzene nuclei containing from 6 to 18 carbon atoms (e. g., a phenyl, naphthyl, anthracyl, penanthryl, diphenyl, or terphenyl radical).

"Aralkyl radical" as used herein means a radical consisting of any aliphatic radical hereinbefore described, in which one hydrogen atom has been replaced by an aromatic radical having from one to three benzene nuclei containing from 6 to 18 carbon atoms (e. g., radicals of the benzene, naphthalene, anthracene, phenanthrene, diphenyl or terphenyl series), having a total of not more than 20 nuclear and side chain carbon atoms, having not more than five side chains, and having no substituents or having from one to five nuclear substituents each of which is a halogen of atomic weight less than 80. Any side chain on the aromatic radical is a monovalent or divalent aliphatic radical containing not more than 6 carbon atoms, the side chains which are closed having from 2 to 6 carbon atoms connected either to one nuclear carbon atom (e. g., cyclohexylphenyl) or to two different nuclear carbon atoms (e. g., acenaphthyl). Such aromatic radicals include phenyl, tolyl, xylyl, ethylphenyl, mesityl, methyl-ethylphenyls, n-propylphenyl, propylphenyl, isopropylphenyl, diethylphenyls, pentamethylphenyl, amylphenyls, butylmethylphenyls, propyldimethylphenyls, ethyltrimethylphenyls, diethylmethylphenyls, hexylphenyls, cyclohexylphenyl, amylmethylphenyl, butylethylphenyl, butyldimethylphenyl, propylethylmethylphenyl, diphenyl, dipropylphenyls, naphthyl, 1-methylnaphthyl, 2-methylnaphthyl, 1-ethylnaphthyl, 2-ethylnaphthyl, phenylnaphthyl, anthracyl, 9-methylanthracyl, 2,3-dimethylanthracyl, 2,4-dimethylanthracyl, 9-ethylanthracyl, bromophenyl, o-bromotolyl, m-bromotolyl, p-bromotolyl, o-chlorotolyl, m-chlorotolyl, p-chlorotolyl, 2-chloro-m-fluorotolyl, 2,6-dichlorotolyl, 4-bromo-o-xylyl, dichloroxylyl, 5-bromo-m-xylyl, 2-bromo-p-xylyl, 2-bromomesityl, 3-bromo-o-tolyl, 2-bromo-1-ethylphenyl, 4-bromo-1,3-diethylphenyl, 6-bromo-3-ethyltolyl, 2-bromo-4-ethyltolyl, 4-bromo-1-propylphenyl, 4-bromo-1-isopropylphenyl, 4-bromo-1-methyl-3-isopropylphenyl, 4-bromo-1-tertiary-butylphenyl, 4-bromo-1-tertiary-amylphenyl, chlorophenyl, alpha-bromonaphthyl, beta-bromonaphthyl, 2-chloronaphthyl, 1-bromo-3-chloronaphthyl, 2-chloro-1-methylnaphthyl, 1-bromo-8-methylnaphthyl, 1-bromo-2,3-dimethylnaphthyl, 1-bromo-4-methylnaphthyl, 1,10-dibromo-anthracyl, 9,10-dichloroanthracyl, phenanthryl, 3-methylphenanthryl, and 1,4-dimethylphenanthryl.

"Alkaryl radical" is used herein to include a mono-, di- or tri-alkyl-substituted phenyl radical in which each substituent is methyl, ethyl, ether propyl, any butyl, any pentyl or any hexyl radical so long as the total number of carbon atoms in the alkyl substituents does not exceed 6; the alkaryl radical can also be a mono- or di-methyl-substituted naphthyl or an ethyl-substituted naphthyl radical.

"Hydrolyzable radical" is used herein to mean a halo, alkoxy, amino, aroxy or acyloxy radical, which is as follows: the halo radical is any one having an atomic weight less than 80 (i. e., fluoro, chloro or bromo). The alkoxy radical is any primary or secondary alkoxy radical having from one to four carbon atoms (i. e., methoxy, ethoxy, propoxy, isopropoxy, n-butoxy, isobutoxy, or secondary butoxy). Amino is simply the —NH₂ group. The aroxy radical is any in which the aryl group is phenyl, or a mono-, di- or tri-substituted phenyl radical, each substituent being a primary, secondary or tertiary alkyl radical having from one to five carbon atoms, the total number of carbon atoms in the side chains being not more than five (i. e., the aryl radical is phenyl, or ortho-, meta- or para-methylphenyl, any di- or tri-methylphenyl, or any substituted phenyl in which the substitutents are: one ethyl; one ethyl and one methyl; two ethyls; two methyls and one ethyl; two ethyls and one methyl; either propyl radical; either propyl radical and two methyls; either propyl radical and ethyl; any butyl radical and methyl; or any pentyl radical). The acyloxy radical has the general formula

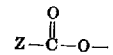

in which Z is a saturated or unsaturated straight, branched or closed chain hydrocarbon radical having from one to eighteen carbon atoms, or phenyl or substituted phenyl, the substituents, if any, consisting of from one to three alkyl radicals each having from one to five carbon atoms, and all having a total of not more than five carbon atoms, as hereinbefore described.

Examples of hydrolyzable organosilanes that can be used in the production of alkyd resins of the invention include methyltrifluoro- or chloro- or bromo-, dimethyldifluoro- or chloro- or bromo-, ethyltrifluoro- or chloro-, diethyldichloro-, n propyltrifluoro or chloro-, di-n-propyldichloro-, isopropyltrifluoro-, n-butyltrifluoro- or chloro-, di-n-butyldifluoro-, isobutyltrichloro-, secondary butyltrichloro- n-pentyltrifluoro- or chloro-, di-n-pentyldifluoro-, 2 - methylpentyltrichloro-, 2 - (2,2,4 - trimethylpentyl)trichloro-, diethyldiethoxy-, ethyltrimethoxy- or ethoxy- or propoxy- or n-butoxy- or isopropoxy-, diethylchloroethoxy-, ethylchlorodiethoxy-, n-propylchlorodifluoro, n-propylfluorodichloro-, isopropylchlorodifluoro-, isopropylfluorodichloro-, n-butylchlorodifluoro-, n-butylfluorodichloro-, isopentyltrichloro-, ethylmethyldichloro-, methylpropyldichloro-, monohydrophenyldichloro-, monohydroethyldichloro-, n-propyltriethoxy-, isopropyltriethoxy-, n-butyltriethoxy-, isobutylchloromethoxyethoxy-, isopentyltriethoxy-, ethyldiethoxyacetoxy-, phenyltrifluoro- or ethoxy- or propoxy- or isobutoxy-, diphenyldifluoro- or chloro- or bromo- or ethoxy- or phenoxy-, ethylphenyldichloro-, ethylbenzyldichloro-, diphenylchlorophenoxy-, phenylbenzyldiethoxy-, benzyltriethoxy-, (2,4-dimethylphenyl)triethoxy-, alpha-naphthyltriethoxy-, beta-naphthyltriethoxy-, cyclohexyltrichloro-, trimethylcyclohexyltrichloro-, p-tertiary-amylcyclohexyltrichloro-, butyltributoxy-, cyclohexyltributoxy-, secondary butyltributoxy-, alpha - (trichlorophenyl)ethyltrichloro-, beta - (trichlorophenyl)ethyltrichloro-, gamma-tolylpropyltrichloro-, gamma-tolylbutyltrichloro-, beta-phenylethyltrichloro-, beta-tolylbutyltrichloro-, beta-tolylpropyltrichloro-, beta-phenylpropyltrichloro-, beta - (chlorophenyl)ethyltrichloro-, alpha-tolylethyl trichloro-, beta-tolylisobutyltrichloro-silanes, and the like.

Organosilanes whose molecule consists of a silicon atom to which are attached four monovalent radicals, from one to three of which are aliphatic radicals, aralkyl radicals, aryl radicals or alkaryl radicals, the remainder of such monovalent radicals being hydrolyzable radicals, are prepared by means of a Grignard reaction between (1) a silicon tetrahalide, an alkyl orthosilicate, an organotrihalosilane or an organotrialkoxysilane and (2) a halo-substituted hydrocarbon, in the presence of magnesium; the halosubstituted hydrocarbon and the magnesium are believed to react to produce an organo magnesium halide which then reacts with the silicon tetra-halide, alkyl orthosilicate, organotrihalosilane or organotrialkoxysilane. Such reactions proceed at a faster rate at elevated temperatures and are usually exothermic in nature. It is ordinarily desirable, therefore, to conduct the reaction in a vessel equipped with a heating coil and cooling means (e. g., a reflux condenser) so that the reactants can be heated to such a temperature that the reaction proceeds at a substantial rate, and that the maximum output of heat generated by the reaction can be removed through the cooling means. It is usually desirable to conduct the reaction in the presence of diethylether as a solvent; the ether has the double effect of initiating the Grignard reaction and of facilitating control of the temperature in the reaction vessel. The reaction proceeds less readily to produce alkoxysilanes than it does to produce halosilanes so that it may be desirable to conduct the reaction between an organo magnesium halide and an alkyl orthosilicate under somewhat more drastic conditions than are usually desirable when the reaction is conducted with a tetrahalosilane. This is particularly true when the reaction is used to produce a dialkoxysilane from an alkyl orthosilicate; in this case, it may be desirable to initiate the reaction in the presence of diethyl ether and then to supply sufficient heat to the reactor so that all the ether is distilled. The reaction is then conducted at a sufficiently high temperature that two alkoxy radicals are replaced by organo radicals. The magnesium salts produced during the course of the reaction are removed by filtration, and the organosilanes are isolated by fractional distillation of the filtrate. The silanes so produced have hydrolyzable groups which are halo radicals or alkoxy radicals.

Examples of the halo-substituted hydrocarbons that can be reacted with a silicon tetrahalide, an alkyl orthosilicate, an organotrihalosilane or an organitrialkoxysilane, in the presence of magnesium, as hereinbefore described, include primary and secondary alkyl halides, such as methyl bromide or chloride or iodide, ethyl bromide or chloride, n-propyl bromide or chloride, isopropyl bromide or chloride, n-butyl bromide or chloride, secondary butyl bromide or chloride, isobutyl bromide or chloride, n-amyl bromide, isoamyl bromide, secondary amyl bromide, n-hexyl bromide, n-heptyl bromide, 3-bromoheptane, 4-bromoheptane, n-octyl bromide, 2-bromooctane, 2-iodononane, 1 - bromo - 3 - methylnonane, 4-chloro-4-methylnonane, 5-chloro - 5 - methylnonane, 2-bromodecane, 1-bromo - 6 - methyldecane, 2-chloro - 2 - methyldecane, 5-chloro-5-ethyldecane, 1-bromododecane and 4-bromododecane; halo derivatives of hydrocarbons of the benzene series, such as bromobenzene alpha-bromotoluene, alpha-iododtoluene, o-bromotoluene, m-bromo-toluene, p-bromotoluene, 4-bromo-o-xylene, 4-bromo-m-xylene, 5-bromo-m-xylene, 2-bromo -p- xylene, 3-bromopseudocumene, 5-bromopseudocumene, 6-bromopseudocumene, 2-bromomesitylene, 3-bromo-o-xylene, 2-bromo-1-ethyl benzene, 4-bromo - 1 - ethyl benzene, 4-bromo - 1,3 - diethyl benzene, 2-iodo-1,3,5-triethyl benzene, 6-bromo-3-ethyl toluene, 2-bromo-4-ethyl toluene, 4-bromo-1-propyl benzene, 4-bromo-isopropyl benzene, 4-bromo-1-methyl-3-isopropyl benzene, 6-bromo-1-methyl-3-isopropyl benzene, 2-bromo-p-cymene, 3-bromo-p-cymene, 4-bromo-1-butyl benzene, 4-bromo-1-tertiary butyl benzene, 4-bromo-1-isoamyl benzene and 4-bromo-1-tertiary amyl benzene; and halo derivatives of hydrocarbons of the naphthalene series, such as alpha-bromonaphthalene, beta-bromonaphthalene, 1-bromo-8-methyl naphthalene, 1-bromo-7-methyl naphthalene, 1-bromo-2-methyl naphthalene, 4-bromo-2-methyl naphthalene, 8-bromo-2-methyl naphthalene, 1-bromo-5-methyl naphthalene, 1-bromo-2,7-dimethyl naphthalene, 4-bromo-1,6-dimethyl naphthalene, 1-bromo-2,6-dimethyl naphthalene, 4-bromo-1,2-dimethyl naphthalene, 1-bromo-2,3-dimethyl naphthalene, 1-bromo-4-methyl naphthalene and 7-bromo-1-methyl naphthalene.

Silanes (that can be used in the practice of the invention) having hydrolyzable radicals that are halo groups are also produced by means of a reaction between an alkene or an aryl alkene having from 2 to 12 carbon atoms and a silane whose molecule consists of a silicon atom to which are attached (a) one hydrogen; (b) from one to three halogens; and (c) not more than two radicals that are alkyl, aralkyl, aryl or alkaryl. Silanes that are produced by means of such a reaction have alkyl radicals derived from alkenes by the addition of a hydrogen to one of the carbon atoms linked by the double bond in the alkene molecule, or aralkyl radicals so derived from aryl alkenes, the free valence being attached to the other of the carbon atoms linked by the double bond in the alkene or aryl alkene. Such alkyl or aralkyl radicals have from 2 to 12 carbon atoms; the alkyl radicals may be straight or branched or closed chains, whereas the aralkyl radicals may be phenylethyl, naphthylethyl, phenylpropyl or (alkylphenyl)ethyl radicals. Example of alkenes that can be so reacted include ethylene, propene, and any butene, pentene, hexene, heptene, octene, nonene, decene, undecene or dodecene. Styrene, allyl benzene, 3-allyl toluene and α- or β-vinylnaphthalene are examples of aryl alkenes that can be so reacted.

Monoalkysilanes having hydrolyzable radicals that are alkoxy groups having from one to four carbon atoms are preferably prepared by a procedure which consists in reacting the corresponding alkyl(or cycloalkyl)trihalosilane with a primary or secondary aliphatic alcohol whole molecule contains from one to four carbon atoms (e. g., methanol, ethanol, 1-propanol, isopropyl alcohol, or 1- or 2-butanol). In such a reaction, it is necessary to use fairly high reaction temperatures since alkyltrihalosilanes are somewhat less reactive than the corresponding silicon tetrahalides. At higher temperatures the HCl evolved during the reaction tends to react with the alkoxysilane products to give alkyl chlorides and partially condensed siloxanes. It is desirable, therefore, to use carbon tetrachloride or chloroform as a solvent to assist in the rapid removal of HCl from the reaction zone. It is desirable to use about a 10 per cent excess of the alcohol over the number of mols theoretically required to react with all of the alkyltrihalosilane, and to add the alcohol to a solution (at room temperature) of the alkyltrihalosilane in a volume of carbon tetrachloride or chloroform approximately equal to the volume of the alcohol. ("Per cent" and "parts" as used herein mean per cent and parts by weight unless otherwise specified.) The rate of alcohol addition should be such that HCl is not evolved too vigorously. As HCl is evolved the temperature drops spontaneously to about 10 degrees C. After the addition of the alcohol is complete, the mixture is refluxed for three to four hours with stirring. The reaction mixture is then distilled from a small amount of anhydrous sodium or potassium carbonate (to prevent bumping during the distillation). Such a procedure ordinarily gives approximately a 90 per cent yield of the alkyltrialkoxysilane. By a similar procedure, monoalkylsilanes having aroxy radicals attached to the silicon atom in the silane molecule are prepared by reaction between the corresponding halosilane and phenol or a monalkyl-, dialkyl- or trialkyl-substituted phenol in which each alkyl substituent has from one to five carbon atoms, and all the alkyl substituents contain a total of not more than five carbon atoms. Such a reaction is best brought to completion by heating the reactants for four to eight hours at a temperature of about 170 degrees C. in the presence of anhydrous aluminum chloride as a catalyst (about 10 mol per cent based on the mols of alkyltrihalosilane). It is preferable to use about a 10 per cent excess of the arylhydroxide and to distill the excess of the arylhydroxide from the crude product before the product is distilled. The distilled product is washed with hot aqueous alkali and then with hot potassium permanganate solution. The product is filtered from the solid manganese dioxide which forms during the washing and the filtrate is washed again with hot alkali, before redistillation to recover the pure alkyltriaroxysilane. The oxidizing treatment (i. e., with aqueous potassium permanganate) is ordinarily necessary to obtain a product that is stable to light.

Aralkylsilanes are preferably prepared by a procedure which consists in reacting a haloalkylsilane (e. g., alpha-chloroethyltrichlorosilane, beta - chloroethyltrichlorosilane, alpha-chloropropyltrichlorosilane, beta-chloropropyltrichlorosilane, gamma - chloropropyltrichlorosilane, chlorocyclohexyltrichlorosilane, alpha-chloroethylethyldichlorosilane, 1,1-dichloroethyltrichlorosilane, 1,2-dichloroethyltrichlorosilane, beta - chlorobutyltrichlorosilane, gamma - chlorobutyltrichlorosilane, delta - chlorobutyltrichlorosilane, alpha - chlorobutyltrichlorosilane, beta-chloroisobutyltrichlorosilane, or beta-chloroethylethyldichlorosilane) with an aromatic hydrocarbon in the presence of aluminum chloride or aluminum bromide.

In such a reaction, the halogen atoms is split out of the haloalkyl radical in the silane molecule and a hydrogen atom is spit out of the aromatic nucleus in the aromatic hydrocarbon molecule so that the two reacting molecules are linked into a single molecule by a

bond. Aromatic hydrocarbons that may be used in such a reaction include (a) benzene, toluene, xylenes, ethylbenzene, mesitylene, methylethylbenzenes, n-propylbenzene, isopropylbenzene, n-butylbenzene, isobutylbenzene, cumene, durene, cymene, diethylbenzenes, pentamethylbenzene, amylbenzenes, butylmethylbenzenes, propyldimethylbenzenes, propylethylbenzenes, ethyltrimethylbenzenes, diethylmethylbenzenes, hexylbenzenes, amylmethylbenzenes, butylethylbenzenes, terphenyls, butyldimethylbenzenes, propylethylmethylbenzene, diphenyl, dipropylbenzenes, naphthalene, 1 - methylnaphthalene, 2 - methylnaphthalene, 1 - ethyl naphthalene, 2 - ethyl naphthalene, eudalene, phenylnaphthalene, sapotalene, tethahydronaphthalene, anthracene, 9-methyl anthracene, 2,3-dimethyl anthracene, 2,4-dimethylanthracene, 9-ethyl anthracene, 1,10-dibromoanthracene, phenanthrene, indan, and 1,4-dimethyl phenanthrene, as well as the halo-substituted aromatic hydrocarbons hereinbefore described that are used in preparing aralkylsilanes by a Gringnard reaction. It is preferred that the molar ratio of the aromatic compound to the haloalkyltrihalosilane be approximately 3 to 1, and that the proportion of the aluminum halide catalyst be between .75 and 2 mol per cent (based on the amount of the haloalkyltrihalosilane present in the reaction mixture). Usually, about ¼ to ⅓ of the total amount of the aluminum halide is added very carefully at room temperature to the mixture of silane and aromatic hydrocarbon, which is then heated for about 20 minutes. The remainder of the aluminum halide is then added in portions large enough to maintain a fairly vigorous rate of reaction, with heating between additions, and after the entire amount of the aluminum halide has been added, the reaction mixture is refluxed for the length of time necessary to complete the reaction and drive off HCl. When the reaction goes rather slowly, the heating may be continued while the remainder of the aluminum halide is added in small portions. It is usually desirable to remove the aluminum halide catalyst before distillation to obtain the pure aralkyltrihalosilane. Aluminum chloride may be removed by adding phosphorus oxychloride to the reaction mixture. The phosphorus oxychloride binds the aluminum chloride by reacting with it to form a stable complex. An amount of phosphorus oxychloride equivalent to the amount of aluminum chloride present in the reaction mixture (or in slight excess over the amount of aluminum chloride) is added to the reaction mixture when the mixture has cooled to a temperature slightly below the boiling point of phosphorus oxychloride (107° C.). After further cooling, an amount of a hydrogen solvent equal to volume of the reaction mixture is added to precipitate the AlCl₃.POCl₃ complex. Such hydrocarbon solvents include pentane, ligroin and petroleum ethers. The mixture is allowed to stand over night, and the solid complex is filtered from the solution or the liquid to be distilled is decanted from the mixture, leaving a residue containing the AlCl₃.POCl₃ complex. An absorbing agent such as kieselguhr may be added in place of the hydrocarbon solvent to absorb the AlCl₃.POCl₃ complex and after the reaction mixture cools to room temperature the liquid to be distilled may be filtered from the absorbed complex. There is less chance that aluminum chloride will distill with the product when it is in the form of a complex than when it is in the free state, and when this complex is relatively non-volatile as compared to the organosilane product, the product may be distilled under reduced pressure in the presence of the AlCl₃.POCl₃ complex.

Silanes having, attached to the silicon atom in the silane molecule, one or more amino radicals are produced by reaction between ammonia and an appropriate silane having one or more halo radicals attached to the silicon atom. By such a reaction halo is replaced by NH₂; organosilanes containing amino groups as hydrolyzable radicals can be produced by such reaction.

Silanes having hydrolyzable radicals which consist of acyloxy groups are produced by reaction between an acid anhydride and the appropriate silane having hydrolyzable radicals which consist of alkoxy groups, or, in some instances, by reaction between an appropriate silane having hydrolyzable halo radicals and the sodium salt of the suitable organic acid.

When a mixture of hydrolyzable organosilanes is used in the practice of the invention, all of the silanes in the mixture may have the same r/Si ratio, or one or more of the silanes may have an r/Si ratio of 1.0 and one or more other silanes may have an r/Si ratio of 2.0 or 3.0. ("r/Si ratio" is used herein to indicate the total number of non-hydrolyzable radicals attached to silicon atoms in the molecules of the silanes divided by the total number of silicon atoms.) It is usually preferable that the r/Si ratio of the hydrolyzable organosilanes be not higher than about 2.0, although a hydrolyzable organosilane or mixture of silanes having an r/Si ratio as high as about 3.0 can be used. It is usually most desirable to use a mixture of silanes having an r/Si ratio of about 1.0 (i. e., the preferred resins of the invention are those whose molecules contain an average of only one organic radical attached by a carbon-silicon linkage to each silicon atom). However, in some instances, it may be advantageous to add to the organosilane such a tetra-functional silicon compound as an alkyl orthosilicate or a silicon tetrahalide (in which the halogens have an atomic weight less than 80); when this is done, the r/Si ratio of the mixture that is reacted may be lower than 1.0. The alkyl orthosilicate can be any one in which the alkyl radical is a primary or secondary alkyl radical having from one to four carbon atoms. Although the r/Si ratio of the mixture may be as low as about 0.5 it is preferable that it be not less than about 0.7. Most desirably, the r/Si ratio of the mixture is not less than about 0.9.

It is preferred that the silanols which are esterified with epihalohydrin condensation polymers in the production of resins of the invention be derived from mono-organosilanes, since such silanes are cheaply and readily prepared. It is most desirable that the mono-organosilanes used as starting materials in the present invention be ethylsilanes such as ethyltrichlorosilane, or mixtures of ethylsilanes with cycloaliphaticsilanes such as cyclohexyltrichlorosilane.

Preparation of synthetic resin

In the production of resins of the invention a hydrolyzable organosilane may be hydrolyzed and a solution of the hydrolysis products may be reacted with a fatty acid-modified epihalohydrin condensation polymer. In the hydrolysis of a hydrolyzable organosilane, the reaction of each hydrolyzable radical (Y) is believed to correspond essentially to Equation 1 (below):

(1) 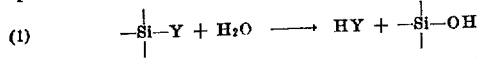

During or immediately after hydrolysis, the hydrolyzed organosilane (monomeric silanol) may undergo condensation, at least to a slight extent, to produce

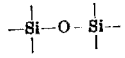

linkages, i. e., siloxane linkages. It is not necessary to isolate the products of the hydrolysis of the organosilane before reacting them with the alcoholic hydroxy groups of a fatty acid-modified epihalohydrin condensation polymer to produce a resin of the invention. That is, the solution of the hydrolysis products, comprising mixtures of silanols, can be reacted directly with an epihalohydrin condensation polymer. In fact, resins of the invention can be produced by an ester-interchange reaction which does not include the step of hydrolyzing the hydrolyzable organosilane to produce an actual silanol. The mechanism by which a hydrolyzable organisilane reacts directly with an alcoholic hydroxy group of an epihalohydrin condensation polymer is believed to be an ester-interchange reaction between a hydrolyzable group in the molecule of the organosilane and an unesterifed alcoholic OH group in the molecular structure of the condensation polymer, with the formation of a

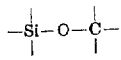

bond, the hydrolyzable radical being released to form a compound whose structure depends upon the particular type of hydrolyzable radical involved. (For example, when the hydrolyzable radical is an alkoxy radical, the compound is an alcohol.)

When a hydrolyzable organosilane is hydrolyzed to a silanol before reacting it with a fatty acid-modified epihalohydrin condensation polymer in the practice of the invention, the hydrolysis may be conducted by adding the hydrolyzable silane or mixture of silanes to a hydrolyzing solution. The addition should be made at a rate sufficiently slow that the exothermic hydrolysis reaction does not cause local overheating (i. e., at such a rate that one mol of silane per liter of reaction mixture is added in from about 5 to about 10 minutes). It is usually desirable, also, that the hydrolyzing solution be stirred during the silane addition; otherwise, local overheating may result in spite of a slow rate of silane addition.

The hydrolyzing agent may be water alone or (in the case of less readily hydrolyzed silanes) an aqueous solution of a mineral acid. It is sometimes desirable to use a water solution of a base, such as NaOH or NH4OH, as the hydrolyzing solution. Halosilanes are readily hydrolyzed by water alone and it is often desirable to hydrolyze them with a water-ice slurry; the hydrolysis produces a hydrohalic acid which then serves as a catalyst for further hydrolysis. Amino, acyloxy, aroxy and alkoxy radicals are progressively more difficult to hydrolyze, and amino radicals are more difficult to hydrolyze than halo radicals. It is usually desirable to use a dilute aqueous solution of a mineral acid as the hydrolyzing agent with silanes having hydrolyzable radicals which consist of amino, acyloxy or aroxy radicals, although it is possible to hydrolyze these radicals with water alone. Alkoxy radicals are more difficult to hydrolyze than are any of the other four so that a more drastic hydrolysis reaction is desirable; the more drastic hydrolysis reaction may be provided by a higher temperature, a stronger aqueous mineral acid solution as the hydrolyzing agent or little or no solvent (for the silanes), which serves as a diluent. The mineral acids that are used as hydrolysis catalysts include hydrochloric, sulfuric and phosphoric, hydrochloric usually being preferred. The amount of hydrolyzing solution that is used includes at least enough water to effect complete hydrolysis of the silanes (i. e., at least one gram mol of water for every two gram atoms of hydrolyzable radicals in the silane to be hydrolyzed). It is usually advantageous to use a considerable excess of water, e. g., from 5 to 10 gram mols for every two gram atoms of hydrolyzable radicals, but it is ordinarily not advantageous to use more than about 20 gram mols of water for every two gram atoms of hydrolyzable radicals. To hydrolyze the more readily hydrolyzable silanes it is often advantageous to effect the hydrolysis at a relatively low temperature. As hereinbefore described this is readily accomplished by supplying the water for the hydrolysis in the form of ice.

It is usually desirable to dissolve the silanes in a solvent. Suitable solvents include ethers such as diethyl, ethylpropyls, dipropyls, propylbutyls and cyclic ethers such as dioxane; hydrocarbon solvents such as benzene, toluene, xylenes, hexanes, heptanes, and octanes; esters such as butyl acetate and isopropyl acetate; ketones such as acetone, methylethylketone, methylisobutylketone and diethylketone; and alcohols such as methyl alcohol, ethyl alcohol, propyl alcohols and butyl alcohols. It is usually desirable to conduct the hydrolysis in a two-phase system, i. e., using solvents which dissolve only the silane. Such solvents include the ethers, esters, ketones and the higher alcohols. It is usually desirable to use a substantial amount of a solvent or solvents (e. g., from about 100 to about 300 ml. of solvents per gram mol of silane), although in some instances (e. g., when the silane is hydrolyzable only with comparative difficulty) it is desirable to use considerably less solvent, while in still other instances (e. g., when the silane is particularly easy to hydrolyze) it is desirable to use somewhat more solvent.

It has been found that the hydrolysis is usually substantially complete within from about 5 to about 10 minutes after the addition of the silane to the hydrolyzing solution has been completed. Apparently, leaving the silane in contact with the hydrolyzing solution for longer periods of time has no deleterious effect on the resulting products. The silane layer is allowed to separate from the water layer (e. g., in a separatory funnel) and the water layer is drawn off and extracted with a water-immiscible solvent such as diethyl ether. This extract is combined with the silane layer. The separated solution of hydrolyzed silanes may be washed with water and dried (e. g., over such a drying agent as anhydrous calcium chloride or anhydrous sodium sulfate). The drying agent is then removed (e. g., by filtration) from the dried solvent solution of the hydrolysis products.

As hereinbefore stated, hydrolyzable organosilanes that can be used in the practice of the invention include those having not more than two hydrogen atoms attached to the silicon atom in the silane molecule. Hydrogen acts as either a hydrolyzable or a non-hydrolyzable radical, depending upon the particular hydrolyzing solution that is used. For example, if the hydrolyzing solution is a dilute water solution of a mineral acid, or water alone, hydrogen is not hydrolyzed, and acts as a non-hydrolyzable radical; on the other hand, if the hydrolyzing solution is a dilute water solution of a base, hydrogen is hydrolyzed, so that it acts as a hydrolyzable radical. Thus, whether hydrogen is counted as a hydrolyzable radical or as an organic radical (e. g., in computing the r/Si ratio) depends upon what hydrolyzing solution is employed.

When a hydrolyzable organosilane is hydrolyzed before reacting it with a fatty acid-modified epihalohydrin condensation polymer to produce a resin of the invention, it is usually preferable to add the dried solvent solution of the hydrolysis products to the epihalohydrin condensation polymer and then to heat in order to effect reaction between the hydrolysis products and the polymer. If desired, part of the organic solvent may be distilled from the hydrolysis products before admixture with the polymer. When the products of the hydrolysis of a hydrolyzable organosilane or mixture of such silanes are mixed with a fatty acid-modified epihalohydrin condensation polymer and the resulting mixture is heated, it is believed that water is formed both by condensation of alcoholic hydroxy groups in the molecules of the polymer with hydroxy groups attached to silicon atoms (to yield

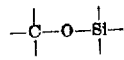

bonds) and by condensation of hydroxy groups connected to different silicon atoms (to yield

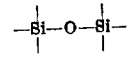

bonds). It usually is desirable to distill the water formed during the heating; it is convenient to accomplish this by effecting the heating under reflux, returning to the resin mixture the material that boils substantially above 100° C. It is frequently advantageous to distill volatile matter other than water during the heating (when the hydrolysis solvent is diethyl ether the other volatile matter is the diethyl ether, and this is distilled while the resin mixture is being heated to the reflux temperature). However, when the hydrolysis is conducted in a solvent that is to be present in the finished material, e. g., xylene, and no substantial excess of solvent is present (it is usually desirable that there be from about 50 to about 70 per cent solids in the finished resin; preferably, the solids content is from about 55 to about 65 per cent), there is no reason to distill any volatile matter other than the water.

When resins of the invention are produced by reacting a fatty acid-modified epihalohydrin condensation polymer with a hydrolyzable organosilane (as hereinbefore described), the hydrolyzable radicals are released during the formation of substituted alcoholic hydroxy groups (i. e.,

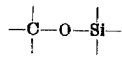

bonds), and alkoxy radicals become alcohols, acyloxy radicals become carboxy acids, aroxy radicals become phenols, and halo radicals become hydrogen halides. It is usually preferable to conduct the reaction at such a temperature and under such conditions that the by-products are distilled from the resin; therefore, the preferred hydrolyzable radicals are those which form low boiling alcohols and acids, i. e., those boiling at a temperature not higher than about 150 degrees C. Aroxy radicals are usually less desirable than are alkoxy and acyloxy radicals, since their comparatively high boiling temperatures make their complete removal from the resin extremely difficult.

It is usually desirable that an esterification catalyst such as HCl or SiCl₄ be added to the mixture (usually in an amount not less than about 0.1 per cent of the mixture, and, preferably, in an amount not less than about 0.2 per cent; it is ordinarily desirable that such a catalyst be used in an amount not greater than about 0.5 per cent of the mixture, and preferable that it be used in an amount not greater than about 0.4 per cent). Calcium naphthenate can also be used as an esterification catalyst, usually in a somewhat larger amount, e. g., ordinarily not less than about 1 per cent of the mixture, and preferably, not less than about 2 per cent; it is ordinarily desirable that calcium naphthenate be used in an amount not greater than about 5 per cent of the mixture, and preferable that it can be used in an amount not greater than about 4 per cent.

Usually it is desirable to distill the volatile organic material formed during the heating; it is convenient to accomplish this by effecting the heating under reflux and returning to the resin mixture the material that boils substantially above the boiling temperature of the highest boiling volatile organic material so produced. This may be impractical in the case of certain phenols, because their boiling points are higher than the temperatures at which the reaction is usually conducted. Ordinarily the reaction is conducted under reflux, the liquid temperature being not higher than about 300° C., and, preferably, not higher than about 250° C. The reflux temperature of the reaction mixture is usually not lower than about 200° C. A solvent can be added to the mixture of epihalohydrin condensation polymer and hydrolyzable organosilane before the reaction is initiated, e. g., one of the solvents hereinbefore named for the condensation polymer. The amount of such solvent that is added can be varied within wide limits, e. g., so that the volume of solvent in the mixture is as little as about ⅓ the volume of the mixture or as much as about ¾ the volume of the mixture. The desired amount of such a solvent may be added after the reaction. On the other hand, an excess of solvent may be added to the reactants, and this excess distilled, e. g., through the reflux condenser, along with the alcohol, acid or phenol. The solvents that are ordinarily used are more volatile than are the phenols which result from the reaction; as a consequence, they are distilled with these phenols, and, when the hydrolyzable organosilane has aroxy radicals as the hydrolyzable groups, it is desirable to add solvent as the reaction proceeds to replace that distilled, so that the resin does not become too viscous.

Although the foregoing discussion of the preparation of the resins of the invention has been concerned chiefly with those in which the organosilicon reactant is a hydrolyzable organosilane, resins of the invention can, of course, be produced, by any of the procedures described for a hydrolyzable organosilane, from an organosiloxane having hydrolyzable radicals attached to silicon atoms.

For example, an organosiloxane which may be used in the practice of the invention, whose molecule contains hydrolyzable groups attached to silicon atoms, may be a substance having the following empirical formula

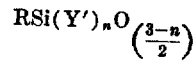

wherein $n$ is a number from one-third to two; R is a straight or branched chain aliphatic radical having from two to twelve carbon atoms, as hereinbefore described, or an aralkyl radical, as hereinbefore described, in which the aliphatic part of the radical is a straight or branched chain; and Y' is a primary or secondary alkoxy radical having from one to four carbon atoms, as hereinbefore described, or a *halogen* having an atomic weight less than 80. For the sake of brevity, such organosiloxanes may be hereinafter referred to as alkyl (or aralkyl) alkoxysiloxanes or alkyl (or aralkyl) halosiloxanes (e. g., when R in the formula given above is an ethyl radical and Y' is an ethoxy or chloro group, the organosiloxane will be referred to as an ethylethoxysiloxane or an ethylchlorosiloxane) although such names, of course, do not identify the actual molecular structure of the compounds and only serve to identify the starting materials from which the compounds are derived.

An organoalkoxysiloxane may be prepared by reacting an alcohol and water simultaneously with an organotrihalosilane, whereas an organohalosiloxane may be prepared by reacting an organotrihalosilane with an amount of water that is insufficient to hydrolyze all the halo groups attached to the silicon atoms.

Theoretically the hydrolysis of the halo radicals in a mol of an organotrihalosilane requires 1½ mols of water, (i. e., one molecule of water hydrolyzes two halo radicals). When the proportion of water that is reacted with a trihalosilane is less than 1½ mols per mol of trihalosilane, the halo radicals that are not hydrolyzed by the insufficient quantity of water remain attached to silicon atoms, and the product resulting from the hydrolysis (and condensation) is an organohalosiloxane. However, when a mixture of an alcohol and water in which the quantity of water is less than 1½ mols is reacted with a mol of an organotrihalosilane, the halo radicals that are not hydrolyzed by the insufficient quantity of water react with the alcohol (one molecule of the alcohol reacts with one halo radical) with the evolution of a hydrogen halide. The product so obtained is an organoalkoxysiloxane, whose molecular structure is predominantly a chain, a ring, or a chain of rings depending upon the proportions of water and alcohol employed. The proportion of water in a mixture of water and an alcohol that is reacted with an organotrihalosilane may be from ½ to 1½ mols per mol of silane, and the proportion of the alcohol should be at least sufficient to react with the halo radicals that are not hydrolyzed by the water. Thus, the oxygen atoms which connect the silicon atoms in the molecular structure of the organoalkoxysiloxane that is obtained are derived from the hydrolysis of part of the halo radicals in the trihalosilane starting material, and average from ½ to 1½ per silicon atom, depending upon the amount of water that is reacted per mol of trihalosilane. Similarly, the alkoxy radicals that are connected to the silicon atoms are derived from the reaction of the alcohol with the halo radicals in the trihalosilane starting material that are not hydrolyzed by the water, and average from ⅓ to 2 per silicon atom (i. e., $n$ is from ⅓ to 2 in the empirical formula given above) depending upon the amount of water that is reacted per mol of silane.

When $n$ in the empirical formula is less than 1, the molecules of the organosiloxane are believed to consist of rings and chains of rings, the radical

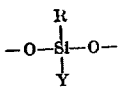

being present both in the rings and in chains connecting the rings. As $n$ decreases and approaches ⅓, the molecular structure is believed to comprise predominantly chains of rings as represented by the following structure (along with some chains of larger rings):

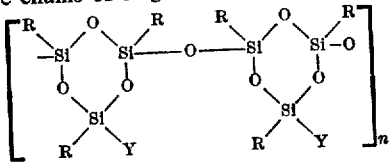

Organoalkoxysiloxanes which may be reacted with a fatty acid modified epihalohydrin condensation polymer to produce resins of the invention are obtained by reacting simultaneously water, a monohydric primary or secondary alcohol having from one to four carbon atoms, and an alkyl-(or aralkyl) trihalosilane.

The proportion of an alcohol employed in the preparation of an organosiloxane is at least the theoretical amount required to react with all of the halo radicals that are not hydrolyzed by the water, for example, with the maximum proportion of water (i. e., 1⅓ mols per mol of silane, the proportion of the alcohol is at least ⅓ mol, and with the minimum proportion of water, i. e., ½ mol per mol of silane, the proportion of the alcohol is at least 2 mols). Ordinarily it is preferable to use the alcohol in an excess over the theoretical amount required to produce the desired organosiloxane, since the halo radicals are less reactive with the alcohol than with the water. Although any desired excess of the alcohol over the theoretical amount, e. g., from approximately 25 per cent to approximately 100 per cent, may be employed, it is ordinarily desirable to use about a 50 per cent excess over the theoretical amount of the alcohol.

A mixture of the alcohol and the water is usually added to a solution of the organotrihalosilane (as hereinafter discussed). The rate of addition of the alcohol-water mixture is limited only by the vigor with which the substances react, and so long as hydrogen chloride is not evolved explosively, it may be as rapid as possible. Although the reaction proceeds slowly at room temperature, it is desirable to reflux the mixture (until the evolution of hydrogen chloride ceases) to bring the reaction to completion as rapidly as possible.

Although the proportion of the alcohol in the mixture of the alcohol and the water may be in excess of the theoretical amount required, it is preferable that it be either the theoretical amount or slightly less at the beginning of the reaction, and that the reaction mixture be refluxed for from two to three hours to insure complete reaction of all the water before adding more alcohol (either an amount in excess of the theoretical amount or a quantity sufficient to bring the initial proportion up to the theoretical amount). Preferably, the refluxing is then continued to complete the reaction with the alcohol of all the halo radicals that are not hydrolyzed by the water.

The alcohol and the water should be present in a one-phase system so that they react simultaneously with the organotrihalosilane. When the molar ratio of water to silane is low (e. g., less than 1.2 to 1), the mixture of the alcohol and the water is ordinarily a one-phase system. With higher ratios of water to silane, it is usually desirable to add any inert solvent which is miscible with water and which is not too high boiling to be practical (since it must be separated from the organosiloxane product by distillation), in an amount sufficient to make the alcohol-water mixture a one-phase system. Such inert solvents include: dioxane and dialkyl ethers of diethylene glycol such as the diethyl and dibutyl ethers of diethylene glycol.

The alcohol water-mixture is usually added to a solution of the silane in a solvent. Although the usual solvents for such silanes may be used, e. g., hydrocarbon solvents such as benzene and toluene, it is far more desirable to use a solvent in which the hydrogen halide formed during the reaction is insoluble, so that it can be easily removed before it can exert any undesirable effect (e. g., by reacting with alkoxy groups attached to silicon atoms in the molecules of the organosiloxane). Such a solvent should not be too high boiling, since it must be separated from the organosiloxane product by distillation, and it should be capable of being distilled at atmospheric pressure without appreciable decomposition. Suitable solvents are halo-substituted alkanes having from one to three carbon atoms and having at least three halo-substituents having an atomic weight between 35 and 80 (i. e., chlorine and bromine). Such solvents include: carbon tetrachloride, chloroform, 1,1,2-trichloroethane, 1,1,2,2-tetrachloroethane, pentachloroethane, hexachlorethane, 1,1,2-trichloropropane, 1,2,2-trichloropropane, 1,2,3-trichloropropane, carbon tetrabromide, bromoform, 1,1,1-tribromoethane, 1,1,2-tribromoethane, and 1,2-dibromo-1,2-dichloroethane. Carbon tetrachloride is a most desirable solvent since it is readily available, and a hydrogen halide, e. g., hydrogen chloride, has very low solubility in it. The hydrogen chloride is expelled in the anhydrous form as soon as it is formed, and may be collected and reused, for example, in the preparation of silicochloroform.

Since the alcohol acts as a solvent for the hydrogen halide, the volume of solvent for the silanes preferably is at least equal to the volume of alcohol and may be as large as is economically feasible. Ordinarily it is desirable to use approximately 200 grams of solvent per mol of silane.

Alkylhalosiloxanes are prepared by a procedure that is the same as the procedure hereinbefore described except that the alcohol is omitted. The liquid organosiloxanes are obtained from the reaction mixture by distillation after removal of excess solvent.

Ordinary epihalohydrin condensation polymers, when mixed with curing agents such as diethylenetriamine or ureaformaldehyde resins, may be cured quickly by heat to form films which are tough, flexible and alkali resistant. However, such resins do not have the good weather resistance that silicon resins possess. It has been found that the synthetic resins of the invention, which are silicone-modified epihalohydrin condensation polymers, may be used to form coatings which not only have excellent hardness, gloss, flexibility, adhesion and alkali resistance and good resistance to soap and salt spray, but also have very good resistance to deterioration upon subjection to extreme weathering conditions. Thus, the esterification of fatty acid-modified epihalohydrin condensation polymers with silanols in accordance with the invention results in a great improvement in the weather resistance of such polymers, while the properties of hardness, flexibility, alkali resistance, etc., possessed to a greater degree by ordinary epihalohydrin condensation polymers than by silicone resins are retained, and in many cases enhanced, in the silicone-modified epihalohydrin condensation polymers embodying the invention.

The minimum proportion of silanol that may be esterified with a fatty acid-modified epihalohydrin condensation polymer in the production of resins of the invention is that which imparts an appreciable improvement in the weather resistance, alkali resistance, water resistance, whereas the maximum proportion of silanol that may be esterified with an epihalohydrin condensation polymer is that above which the resulting resins form coatings that are too brittle to be commercially useful. (In general, the higher the silicon content of the present resins, the greater the brittleness of baked films of the resins.) Ordinarily, the proportion of silicone in a resin of the invention may be as low as 25 per cent of the resin, but it is preferred that it be not less than about 40 per cent of the resin. Although the proportion of silicone in a resin of the invention may be as high as 75 per cent of the resin, it has been found that resins having excellent hardness without undesirable brittleness are ordinarily obtained when the proportion of silicone is not higher than about 60 per cent of the resin. The proportion of silicone expressed as "per cent of the resin" means the weight of the silicone portion of a resin of the invention divided by the total weight of the resin solids (i. e., the resin weight on a solvent-free basis) times 100. The silicone portion may be considered to be derived from a silanol, as hereinbefore defined. The weight of the silicone portion of a resin of the invention is calculated herein as though all OH groups attached to silicon atoms in silanol reactants were completely condensed during the reaction by which the present resins are obtained. The weight of the silicone portion in the final resin is then the sum of the weight of the silicon atoms, the organic radicals which have a carbon atom attached directly to a silicon atom, the oxygen atoms connecting silicon atoms by

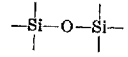

linkages, and half the weight of the oxygen atoms in the

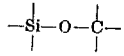

linkages of the substituted alcoholic hydroxy groups in the resin molecules. In determining the proper proportion of, e. g., a silanol to be used in the present invention, the following general formula may be allowed to represent the silicone portion (derived from the silanol) of a resin of the invention:

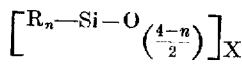

wherein R is an organic radical, $n$ is the average number of such radicals per silicon atom and X is an integer greater than 1. Ordinarily a silanol is used in the practice of the invention in organic solvent solution. The weight of silanol (on a completely condensed basis as represented by the above formula) in a solution can be determined, for example, by filming a sample of the solution on a glass plate and baking the plate until the film is completely cured. The weight of the completely cured film is then the weight, on a completely condensed basis, of the silanol in the sample of the solution. Thus the amount of a silanol solution used in the practice of the invention is that in which the weight of "completely condensed" silanol is from 25 to 75 per cent of the sum of the weight of completely condensed silanol plus the weight of the fatty acid-modified epihalohydrin condensation polymer solids. The condensation polymer used in the preparation of resins of the invention is ordinarily in organic solvent solution. The solids content of such a solution is determined in the usual manner (i. e., the solids content is simply that proportion remaining after low temperature (105 degrees C.) removal of the solvent).

A silicone-modified resin of the present invention may be used in the preparation of an enamel by simply mixing the resin with any desired amount of a suitable pigment or mixture of pigments, by a procedure similar to that used for the preparation of alkyd resin enamels.

The improvement in the properties of the silicone-modified resins of the invention over the fatty acid-modified epihalohydrin condensation polymers themselves has been demonstrated as follows:

An epihalohydrin condenastion polymer (696 grams of "Epon" resin, grade 1004, a commercial resinous reaction product of epichlorohydrin with bisphenol) is mixed with coconut fatty acids (330 grams) in a 1 liter 3-necked flask fitted with a mercury sealed stirrer, a gas inlet tube and a thermometer. The mixture is heated until the "Epon" resin is melted, and then is heated gradually with stirring to 200 degrees C. The temperature is then raised to 260 degrees C. over a period of one and one-half hours, natural gas being bubbled through the mixture after the temperature reaches 250 degrees C. Th mixture is then heated at temperatures ranging between 240 and 260 degrees C. for one and one-half hours. The resulting resin, after dilution to 50 per cent solids with xylene, has a viscosity of T–U (measured by the standard Gardner-Holdt bubble viscometer method). This resin is hereinafter referred to as "Resin A."

A resin of the invention is prepared by esterifying Resin A with a silanol by the following procedure: A mixture of ethyltrichlorosilane (150 grams) and cyclohexyltrichlorosilane (150 grams) in butyl acetate (400 ml.) is added with stirring to water (1000 ml.) which is maintained at a temperature between 0 and 5 degrees C. by an ice-salt bath. When the addition, which requires about one and one-half hours, is complete, the resin layer is separated from the water layer in a separatory funnel and is mixed with Resin A (300 grams).

The mixture is distilled to remove butyl acetate, xylene (150 ml.) being added before the last 100 ml. of the butyl acetate is removed. The residue is placed in a flask fitted with a stirrer and a Stark and Dean trap equipped with a reflux condenser. The mixture is then refluxed for four hours, during which period 120 ml. of xylene is removed. The resulting resin has a solids content of 68.6 percent, viscosity of Z—$Z_1$ (Gardner-Holdt) and color 9–10 (Heilige). This resin of the invention is hereinafter referred to as "Resin SA."

Resins A and SA are made into enamels and their properties tested by the following procedures:

Resin A (40 grams) is ground with rutile titanium dioxide (60 grams) on warm rubber rolls. The resulting paste is then blended with additional Resin A (81.6 grams) and a curing agent (13.4 grams of a urea-formaldehyde resin prepared by the following procedure: Formalin (19.4 parts of an aqueous solution comprising 37.0% formaldehyde) is adjusted to a pH of 7.5 with a dilute aqueous solution of sodium hydroxide, urea (7.2 parts) is added to the resulting solution and the entire mixture is stirred to effect complete solution. This solution of formalin and urea is allowed to stand at about 70° F. for approximately 48 hours. During this time a solid magma of dimethylol urea crystals forms. The dimethylol urea crystals are dried by washing with an equal weight of acetone which is separated by filtration. Oxalic acid (0.24 part) and 1-butanol (71.25 parts) are placed in a distillation flask and the dry dimethylol urea crystals are added. The flask is heated at 70° C. for 30 minutes, and then the mixture is distilled under vacuum until 25 percent of the original weight of the mixture charged into the distillation flask remains. The residue in the flask is then diluted with xylene to a 50 percent solids concentration.

Resin SA (40 grams) is ground with rutile titanium dioxide (60 grams) on warm rubber rolls. The resulting paste is then blended with additional Resin SA (72.5 grams). The enamels prepared from resins A and SA are thinned with xylene to a No. 4 Ford Cup viscosity of 80 seconds.

A film of the enamel prepared from Resin A is baked on a glass plate for 30 minutes at 300 degrees F. (in accordance with the manufacturer's recommendation for "Epon" resins). A film of the enamel prepared from Resin SA is baked on a glass plate for one hour at 220 degrees C. The film of Resin SA has a Sward hardness of 66, but the film of Resin A is so soft after the cure that it cannot be tested for Sward hardness.

A film of the enamel prepared from Resin A is baked on a glass plate for 40 minutes at 300 degrees F. A film of the enamel prepared from Resin SA is baked on a glass plate for one hour at 220 degrees C. Each film is immersed in an aqueous caustic solution comprising 5 percent of sodium hydroxide at room temperature. After 72 hours of immersion, the film of Resin A fails (i. e., it wrinkles and cracks badly when removed from the caustic solution and dried). The film of Resin SA on the other hand fails only after 1,000 hours of immersion in the caustic solution.

Since films of the enamel prepared from Resin A are so soft upon curing, another composition is used as the control in conducting further tests on the properties of the resin of the invention, Resin SA. The second control composition, hereinafter referred to as Resin B, is prepared by the procedure described for the preparation of Resin A, except that the proportion of the "Epon" resin used is 615 grams and the fatty acid used is dehydrated castor fatty acids (410 grams). The resulting resin upon dilution with xylene to a solids concentration of 50 percent has a viscosity of M-N (Gardner-Holdt). An enamel is prepared from Resin B using the procedure described for the preparation of an enamel from Resin A. A film of the enamel prepared from Resin B baked on a glass plate for 30 minutes at 300 degrees F. has a Sward hardness of 74. A film baked on a glass plate for 40 minutes at 300 degrees F. and immersed in a 5 percent caustic solution does not adhere to the glass plate after 49 hours of immersion.

Films of resins B and SA baked on steel panels for 40 minutes at 300 degrees C. and for one hour at 220 degrees C., respectively, have equally good flexibility (tested by bending the films around a conical mandrel—the films do not crack) and equally good impact strength. The gloss of a film of Resin B is 100 (measured by means of the Gardner 60 degree glossmeter) and the gloss of a film of Resin SA is 93.

A film of the enamel prepared from Resin B is baked on a steel panel for 40 minutes at 300 degrees F. A film of Resin SA is baked on a steel panel for one hour at 220 degrees C. The films are immersed in a hot (160 degrees F.) aqueous soap solution comprising 1.5 per cent of a commercial powdered laundry soap. After 17 hours of immersion, the film of Resin B shows small blisters around its edges, but the film of Resin SA shows no blisters or softening. After 100 hours of immersion, the film of Resin B is blistered and badly wrinkled but the only noticeable effect on the film of Resin SA is a slight loss in gloss.

Similar baked films (on steel panels) of each resin are immersed in boiling distilled water. After two and one-half hours of immersion, the entire film of Resin B is covered with small blisters. The film of Resin SA shows no effect after 14 hours immersion.

Films of Resin B and SA are baked on bonderized steel panels for 40 minutes at 300 degrees F. and for one hour at 220 degrees C., respectively, and are placed in a small cabinet into which is atomized a fine spray of an aqueous salt solution comprising 20 percent of NaCl. After 600 hours, the film of Resin SA shows a rust line that is narrower than $\frac{1}{16}$ inch and the film is glossy and intact, whereas the film of Resin B shows a heavy $\frac{1}{8}$ inch rust line and is blistered and flaky and does not adhere to the panel.

Films of Resins B and SA are baked on bonderized steel panels as described above and are placed in a weatherometer. The original gloss of the film of Resin B is 105. After 1205 hours in the weatherometer, the film is dull (gloss 18), water spotted and shows slight chalking. The film of Resin SA on the other hand, which has an original gloss of 90, has a gloss of 52 after 1205 hours in the weatherometer, shows no chalking and only slight water spotting.

As the above tests demonstrate, a resin of the invention produced by esterification of a fatty acid-modified epihalohydrin condensation polymer with a silanol (e. g., Resin SA) not only has as good hardness, gloss and flexibility as the fatty acid-modified epihalohydrin condensation polymer before esterification with a silanol (e. g., Resins A and B) but also is remarkably superior in such properties as alkali resistance, resistance to boiling water, soap solution and salt spray, and weather resistance (e. g., gloss retention and adhesion upon subjection to severe outdoor weather conditions).

The following examples illustrate the practice of the invention.

*Example 1*

A fatty-acid modified epihalohydrin condensation polymer is prepared as follows:

An epihalohydrin condensation polymer (174 grams of "Epon" resin, grade 1004) is mixed with coconut fatty acids (124 grams) in a 1 liter-3-necked flask fitted with a mercury sealed stirrer, a gas inlet tube and a thermometer. The mixture is heated until the "Epon" resin is melted, and the heating is then continued with stirring while the temperature is gradually raised to 250 degrees C. (over a period of 40 minutes). The mixture is maintained at 250 degrees C. for two and one-half hours. During the last one and one-half hours of heating, natural gas is bubbled through the mixture. The resulting resin, which has an acid number of 3 is diluted to a 50 per cent solids concentration with xylene.

A resin of the invention is prepared as follows:

An ethyl-cyclohexyl silanol is prepared by adding a mixture of ethyltrichlorosilane (50 grams) and cyclohexyltrichlorosilane (50 grams) in butyl acetate (150 ml.) with stirring to water (500 ml.) which is maintained at a temperature below 10 degrees C. by an ice-salt bath. When the addition (which requires 45 minutes) is complete, the resin layer is separated from the water layer in a separatory funnel. The butyl acetate solution of the silanol is mixed with 100 grams of the fatty acid-modified "Epon" resin solution, prepared as described above, and with 50 ml. of xylene. The mixture is distilled to remove butyl acetate and the residue is placed in a flask fitted with a stirrer and a Stark and Dean trap equipped with a reflux condenser. The mixture is then refluxed for three and three-quarter hours, during which period 40 ml. of xylene is removed. The resulting resin has a solids content of 64 per cent, viscosity of U–V (Gardner-Holdt) and color 12 (Heilige). A film of the resin on a glass plate baked for one hour in an oven at about 210 to 215 degrees C. has good hardness, toughness and flexibility. When such a film is immersed in an aqueous solution containing 5 per cent of sodium hydroxide, the film shows no change after 136 hours of immersion, and is still intact after 160 hours although it starts to loosen at the edges from the glass at this time. A similar film is not cracked after baking for over 40 hours at 200 degrees C.

*Example 2*

(a) A resin of the invention is prepared by the procedure described in the last paragraph of Example 1, except that 100 grams of a fatty acid-modified "Epon" resin having a higher fatty acid content is employed, which is prepared as follows: An "Epon" resin, grade 1004 (348 grams) is mixed with coconut fatty acids (310 grams) in a 1 liter 3-necked flask fitted with a mercury sealed stirrer, a gas inlet tube and a thermometer. The mixture is heated to a temperature of 250 degrees C. over a period of one hour and 15 minutes. The mixture is then maintained at 250 degrees C. for three and one-half hours. During the last one and one-half hours of heating natural gas is bubbled through the mixture. The resulting resin, which has an acid number of 10, is diluted to a 40 per cent solids concentration with xylene. The resin of the invention, obtained after four hours of refluxing the ethyl-cyclohexyl silanol prepared as described in Example 1 with the fatty acid-modified "Epon" resin in the apparatus equipped with a Stark and Dean trap (55 ml. of xylene is removed during the refluxing), is filmed on a glass plate. The film is baked for one hour in an oven at a temperature of 230 degrees C. The resulting film is not as hard as the film obtained from the resin prepared as described in Example 1.

(b) A mixture of ethyltrichlorosilane (75 grams) and cyclohexyltrichlorosilane (75 grams) in butyl acetate (200 ml.) is added with stirring to water (500 ml.) which is maintained at a temperature below 10 degrees C. by an ice-salt bath. When the addition (which requires one hour) is complete, the resin layer is separated from the water layer in a separatory funnel. The resin layer is mixed with 50 grams of the fatty-acid modified "Epon" resin solution prepared as described in (a) above. The mixture is then distilled to remove butyl acetate. The residue is placed in a flask fitted with a stirrer and a Stark and Dean trap equipped with a reflux condenser and is then refluxed for six hours during which period 70 ml. of xylene is removed. A film of the resulting resin baked for 40 minutes in an oven at 230 degrees C. is more brittle than the film obtained from the resin prepared as described in Example 1.

*Example 3*

A resin of the invention is prepared by the procedure described in the last paragraph of Example 1, except that the silanol used is a phenyl silanol prepared by adding phenyltrichlorosilane (100 grams) in butyl acetate (200 ml.) with stirring to water (500 ml.) which is maintained at a temperature below 10 degrees C. by an ice-salt bath and separating butyl acetate solution of the silanol from the water layer in a separatory funnel. The resin obtained after one and one-half hours of refluxing the silanol with the fatty acid-modified "Epon" resin in the apparatus equipped with a Stark and Dean trap is filtered. The resulting resin has a solids content of 54.1 per cent, viscosity of T (Gardner-Holdt) and color 10–11 (Heilige).

A film of the resin on a glass plate baked for one hour at 210 degrees C. is hard, tough and light in color. Another film on a steel panel baked for one and one-half hours at 220 degrees C., allowed to cool and then bent double, shows no cracks or evidence of strain. A third film on a steel panel baked at 230 degrees C. for over 48 hours shows no cracks upon cooling.

*Example 4*

An epihalohydrin condensation polymer (615 grams of "Epon" resin, grade 1004) is mixed with dehydrated castor fatty acids (410 grams) in a 1 liter 3-necked flask fitted with a mercury sealed stirrer, a gas inlet tube and a thermometer. The mixture is heated until the "Epon" resin is melted and then is heated gradually with stirring to 200 degrees C. The temperature is then raised to 260 degrees C. over a period of one and one-half hours, natural gas being bubbled through the mixture after the temperature reaches 250 degrees C. The mixture is then heated at temperatures ranging between 240 and 260 degrees C. for one and one-half hours. The resulting resin, after dilution to 50 per cent solids with xylene, has a viscosity of M–N (Gardner-Holdt). The resin (300 grams) is mixed with an ethyl-cyclohexyl silanol (prepared by the procedure described in Example 1, except that the proportions of starting material are as follows: ethyltrichlorosilane, 150 grams, cyclohexyltrichlorosilane 150 grams, and butyl acetate 400 ml.). The mixture is distilled to remove butyl acetate, xylene (150 ml.) being added before the last 100 ml. of the butyl acetate is removed. The residue is placed in a flask fitted with a stirrer and a Stark and Dean trap equipped with a reflux condenser. The mixture is then refluxed for four hours during which 120 ml. of xylene is removed. The resulting resin has a solids content of 63.1 per cent, viscosity of X–Y (Gardner-Holdt) and color 9–10 (Heilige). Upon dilution of the resin to 60 per cent solids with xylene, the viscosity is W–X.

*Example 5*

(a) An "Epon" resin, grade 1004 (2.02 equivalents) is mixed with linseed fatty acids (1.39 equivalents) in a 1 liter 3-necked flask fitted with a mercury sealed stirrer, a gas inlet tube and a thermometer. The mixture is stirred and heated gradually to a temperature of 250 degrees C. After heating the mixture at 250 degrees C. for one hour, natural gas is bubbled through the mixture. The heating is then continued at temperatures ranging between 235 and 260 degrees C. for two hours. The resulting resin is diluted to a 50 per cent solids concentration with xylene. The resin solution (100 grams) is mixed with an ethyl-cyclohexyl silanol, prepared as described in Example 4 except that the proportion of butyl acetate used is 150 ml. The mixture is distilled to remove butyl acetate. The residue is placed in a flask fitted with a stirrer and a Stark and Dean trap equipped with a reflux condenser. The mixture is then refluxed for three and one-half hours, during which 26 ml. of xylene is removed. The resulting resin of the invention has a solids content of 65 per cent.

N,N'-di-n-butyl diphenyl ether disulfonamide (15 grams) is dissolved in aqueous sodium hydroxide (2.8 grams in 20 cc. of water). The solution is heated to about 60° C., and epichlorohydrin (6.4 grams) is added, with stirring, to the heated solution. The stirred mixture is held at about 70° C. until approximately 20 minutes after the epichlorohydrin addition was started. The oily resin layer is separated (e. g., by decantation or in a separatory funnel) from the water phase, and the separated resin is washed with hot water, then with dilute HCl (about 15 weight per cent) and again with hot water.

The fusible resin is dried by heating on a hot plate until all the water is vaporized. The dried resin may be modified with a linseed fatty acid and esterified with a silanol by the procedure described in (a) above to obtain a synthetic resin of the invention.

Having described the invention, I claim:

1. A synthetic resin that is an ester (1) a substance whose molecule contains at least one silicon atom to which at least one hydroxy group is attached, and to which at least one hydrocarbon group is attached by a carbon-silicon linkage, with (2) a fatty acid-modified condensation polymer of the class consisting of reaction products of (a) an epihalohydrin in which the halogen atom has an atomic weight between 35 and 80 with (b) a dihydric phenol, and reaction products (a) such an epihalohydrin with (b) a sulfonamide whose molecule has at least two hydrogen atoms each connected to a sulfonamide nitrogen atom, the amount of substance (1), on a fully condensed basis, being from 25 to 75 per cent of the total weight of the synthetic resin.

2. A synthetic resin as claimed in claim 1 wherein substance (2) is a fatty acid-modified condensation product of epichlorohydrin and a dihydric phenol.

3. A synthetic resin as claimed in claim 2 wherein the dihydric phenol is bisphenol.

4. A synthetic resin that is an ester of (1) a polymeric silanol which is the hydrolysis product of at least one chlorosilane of which one chlorosilane contains a carbocyclic hydrocarbon radical having 6 carbon atoms in the ring and directly connected by one of such atoms to the silicon atom of such chlorosilane, with (2) a fatty acid-modified condensation polymer of the class consisting of reaction products of (a) an epihalohydrin in which the halogen atom has an atomic weight between 35 and 80 with (b) a dihydric phenol, and reaction products of (a) such an epihalohydrin with (b) a sulfonamide whose molecule has at least two hydrogen atoms each connected to a sulfonamide nitrogen atom, the amount of substance (1), on a fully condensed basis, being from 25 to 75 per cent of the total weight of the synthetic resin.

5. A synthetic resin that is an ester of (1) a polymeric silanol which is the hydrolysis product of a monoalkyl chlorosilane and a monohydrocarbon chlorosilane in which the hydrocarbon radical is a 6-carbon carbocyclic radical with (2) a fatty-acid-modified condensation product of epichlorohydrin and bisphenol, the amount of substance (1), on a fully condensed basis, being from 25 to 75 per cent of the total weight of the synthetic resin.

References Cited in the file of this patent

UNITED STATES PATENTS

| Number | Name | Date |
|---|---|---|
| 2,569,920 | Buck et al. | Oct. 2, 1951 |